(12) United States Patent
Davis et al.

(10) Patent No.: US 8,761,379 B2
(45) Date of Patent: Jun. 24, 2014

(54) SYSTEM AND METHOD FOR ESTABLISHING VOICE AND DATA CONNECTION

(75) Inventors: Richard A. Davis, Boulder, CO (US); Anthony J. Brittain, Boulder, CO (US)

(73) Assignee: Radish Systems, LLC, Boulder, CO (US)

( * ) Notice: Subject to any disclaimer, the term of this patent is extended or adjusted under 35 U.S.C. 154(b) by 783 days.

(21) Appl. No.: 12/794,602

(22) Filed: Jun. 4, 2010

(65) Prior Publication Data

US 2010/0310059 A1 Dec. 9, 2010

Related U.S. Application Data

(60) Provisional application No. 61/217,823, filed on Jun. 5, 2009.

(51) Int. Cl.
*H04M 3/00* (2006.01)
(52) U.S. Cl.
USPC ............ 379/265.11; 379/76; 379/88.13; 379/88.18

(58) Field of Classification Search
USPC .............. 379/67.1, 76, 88.18, 93.28, 106.01, 379/211.02, 212.01, 229, 265.01–266.1, 379/88.03, 221.03, 88.13, 265.11
See application file for complete search history.

(56) References Cited

U.S. PATENT DOCUMENTS

| 5,164,982 | A | 11/1992 | Davis | |
|---|---|---|---|---|
| 7,801,284 | B1 * | 9/2010 | Chakra et al. | 379/88.03 |
| 8,254,552 | B2 * | 8/2012 | Harton et al. | 379/221.03 |
| 2002/0080938 | A1 * | 6/2002 | Alexander et al. | 379/106.01 |
| 2002/0090062 | A1 * | 7/2002 | Mohamed Alhadad et al. | 379/67.1 |
| 2004/0258223 | A1 * | 12/2004 | Rahamim | 379/93.28 |
| 2011/0164744 | A1 * | 7/2011 | Olshansky et al. | 379/229 |

* cited by examiner

*Primary Examiner* — Md S Elahee
(74) *Attorney, Agent, or Firm* — Cooley LLP

(57) ABSTRACT

A system and method for improved voice and data communication is described. One embodiment includes a method for voice and data communication, the method comprising connecting to a session server; receiving a voice call from an end-user; receiving an end-user phone number for the end-user; transmitting a session request to the session server, wherein the session request is based on the end-user phone number; and communicating with the end-user over a session established through the session server.

25 Claims, 13 Drawing Sheets

SYSTEM AND METHOD FOR ESTABLISHING VOICE AND DATA CONNECTION

PRIORITY

The present application claims priority to commonly owned and assigned provisional application No. 61/217,823, filed Jun. 5, 2009, entitled "Voice/Data Method and System for Mobile Phone Users," which is incorporated herein by reference.

FIELD OF THE INVENTION

The present invention relates to voice and data communication. In particular, but not by way of limitation, the present invention relates to systems and methods for linking a voice call and a data communication.

BACKGROUND OF THE INVENTION

In today's modern communication environment, individuals frequently use voice and data communications devices from their homes, offices, and while on the go. As the infrastructure of these communications there is an embedded telephone network and Internet infrastructure that exist separately. Accordingly, applications are typically designed for one environment or the other. As a result, it's difficult to have unified voice/data interaction using applications currently available such as web browsing, SMS chat, MMS chat and others. These systems require users and businesses to deal with separate applications with separate interfaces and addressing mechanisms.

Furthermore, applications, like Skype and Vonage, that do attempt to bridge the telephone and Internet environments, do so in a way that provides for voice capability but not data capability, except for end-to-end calls within the network. These latter types of calls are obviously not commonplace in business settings. Other applications, such as WebEx and similar services, allow users to logon and participate in remote presentations with a separate voice call. However, the amount of time required for set-up, log-in, and dialing-in, makes these services unusable in numerous applications.

Although present devices are functional, they are not sufficiently accurate or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for linking voice and data communications. In one exemplary embodiment, the present invention can include a method for voice and data communication, the method comprising connecting to a session server; receiving a voice call from an end-user; receiving an end-user phone number for the end-user; transmitting a session request to the session server, wherein the session request is based on the end-user phone number; and communicating with the end-user over a session established through the session server. In this method, receiving the end-user phone number may comprise automatically receiving the end-user phone number, such as through ANI or Caller-ID supplied from the PSTN or other voice network, or the end-user phone number may received from voice or DTMF responses from the end-user. The method may further include receiving a payload from the session server, wherein the payload includes information related to the end-user that may be used to help control processing for the end-user. The method may also include assessing performance of the session (e.g., assessing the types and qualities of connections for the session); and adjusting communications with the end-user based on the performance of the session.

In another exemplary embodiment, the present invention can include a system for voice and data communication, the system comprising an agent device, wherein the agent device is configured for receiving a voice call from an end-user; transmitting a session request to a session server, wherein the session request comprises an end-user phone number; and communicating with the end-user over a session established through the session server. In one embodiment, this system may comprise a means for receiving (e.g., PBX, PBX/ACD, IVR, agent workstation, etc.) the end-user phone number automatically supplied from the PSTN or other voice network (such as with ANI or Caller-ID).

In another exemplary embodiment, the present invention can include a method for establishing data communication, the method comprising: connecting to an at least one agent device; receiving an end-user notification from an end-user device for an end-user, wherein the end-user notification comprises an end-user telephone number; receiving a session request from the at least one agent device, wherein the session request comprises a target telephone number; and establishing a session between the at least one agent device and the end-user device when the end-user telephone number matches the target telephone number. In another embodiment, the present invention may include a computer readable medium encoded with instructions for performing this method.

In another exemplary embodiment, the present invention can include a system for establishing data communications, the system comprising: at least one end-user device port for establishing a connection with end-user devices; an at least one agent device port for establishing a connection with agent devices; and an at least one data structure for indexing connections with the end-user devices and for indexing connections with the agent devices, wherein the connections with end-user devices are indexed based on end-user phone numbers provided by the end-user devices, and wherein the connections with agent devices are indexed based on an at least one account number for the agent devices.

In another exemplary embodiment, the present invention can include a method for providing an account with information related to an end-user prior to a voice call from the end-user, the method comprising: launching an end-user application; generating a payload, wherein the payload comprises information related to an end-user including the end-user phone number, and wherein the payload further comprises information identifying an account; transmitting the payload, wherein the information identifying the account can be used to transmit the payload to the account. In another embodiment, the present invention may comprise a computer readable medium with instructions for performing this method.

In yet another exemplary embodiment, the present invention can include a method for voice and data communication between an end-user device and an agent device, the method comprising: initiating a voice call to the agent device over a voice path; and connecting to a data session with the agent device over a data path.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
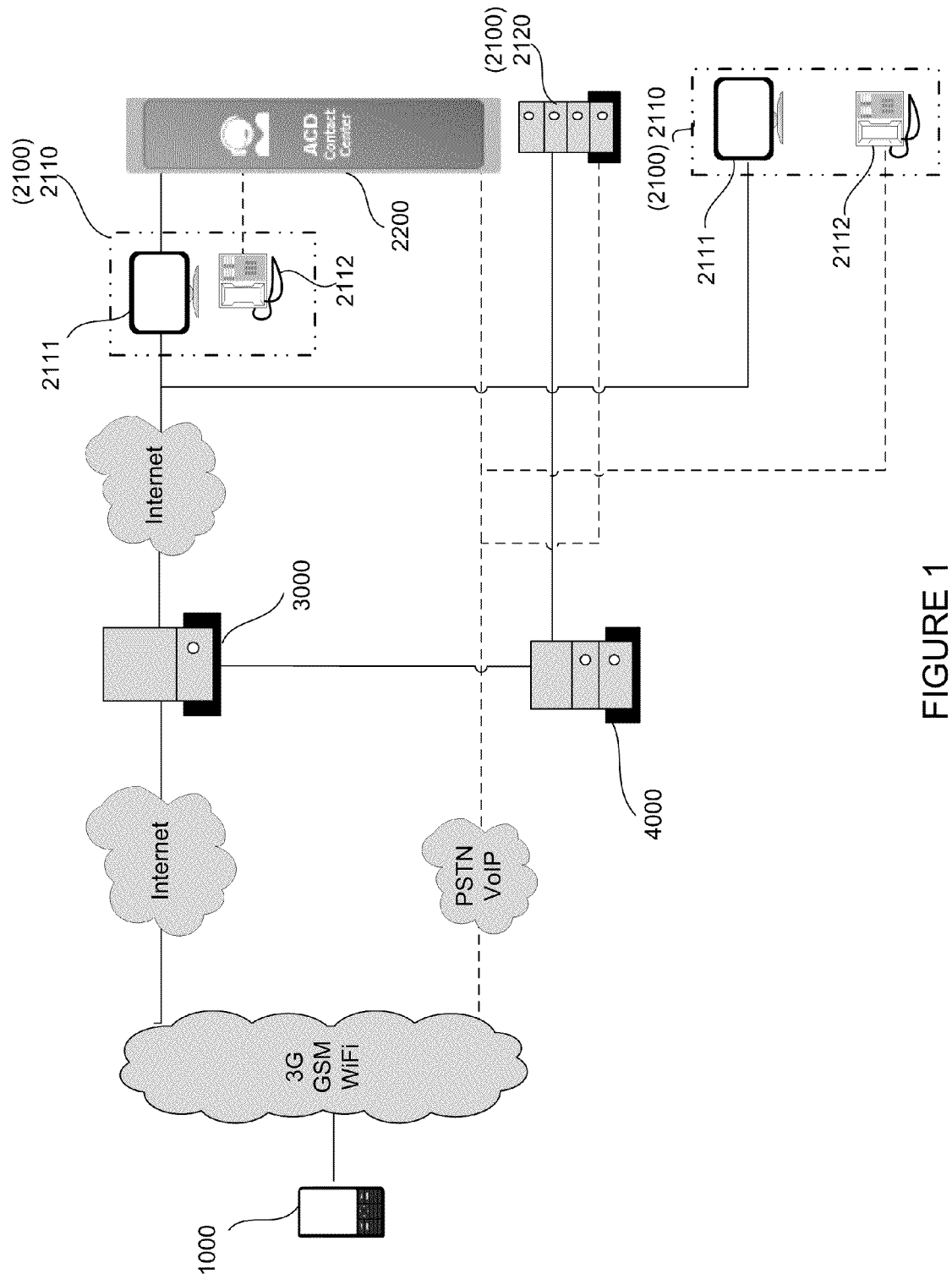
FIG. 1 illustrates an exemplary system for voice and data communication consistent with the present invention.

The present invention provides systems and methods to allow two parties to communicate over a data session. In a preferred embodiment, the present invention includes systems and methods to allow two parties to receive visual information and other data during an ordinary phone call. This includes systems, devices, software applications, and a communication protocol that enable joining a voice call with an associated data connection (also referred to as a data session) to allow an end-user to speak with another party while that party shares visual information in real time that is relevant to the call. In one embodiment, the other party may be a live agent (at an agent workstation) in a contact center or the other party may be an interactive voice response (IVR) system. In another embodiment, the other party may be another end-user.

In addition, the present invention provides systems and methods for context-specific end-user information, called 'payload,' to be delivered to the called party, so that the called party can understand the context of the call in order to control call processing. For example, the payload might allow for a voice call to be routed differently, or may provide a live agent with basic information about the call so that the live agent can answer the call appropriately. Both of these capabilities offer significant gains in phone calls relating to efficiency, understanding and accuracy.

In another embodiment, where an agent (live agent or IVR) calls an end-user, the present invention allows the agent to quickly and easily share visual information with the end-user. This can allow for more effective communication to improve sales, technical support, or other applications.

The present invention can make use of the existing phone capabilities and the existing Internet capabilities. One novel aspect of the present invention is the protocol and software programs that build on the existing voice and data infrastructure. The present invention has the advantage that existing devices, such as mobile devices, Internet enabled devices, agent workstations, and IVR systems, can be modified using software changes to add the new and novel capabilities. For example, end-user devices (such as smartphones, laptops, desktop computer, etc.) can be configured with a self-contained application that integrates voice, data and messaging functions in a simple and convenient user interface.

System Architecture Overview

Referring now to the drawings, where like or similar elements are designated with identical reference numerals throughout the several views, and referring in particular to FIGS. 1-4, illustrated are exemplary system architectures consistent with the present invention. In general, FIGS. 1-4 shows an end-user device 1000 configured for both voice and data communication with an account side 2000, wherein the account side includes agent devices 2100 (such as agent workstation(s) 2110 and/or interactive voice response unit(s) (IVR) 2120). As shown, the end-user device 1000 and agent device 2100 may be configured for voice communication (dotted lines) over a Public Switched Telephone Network (PSTN), a VoIP network and/or some other voice network connection. In addition, the end-user device 1000 and agent device 2100 may be configured for parallel data communication via a session server 3000. In some embodiments, the session server 3000 can connect to the end-user device(s) 1000 and the agent device(s) 2100 via a dynamic socket connection. In a preferred embodiment, the session server 3000 uses the end-user phone number as the addressing mechanism for establishing connections. The data communication between the end-user device 1000 and agent device 2100 may take the form of a single data message and/or a live data session where the end-user and agent can interact in real-time. In some embodiments, a session gateway 4000 may be used to provide an interface between the session server 3000 and an IVR 2120. These components are described in greater detail below.

End-User Device Overview

In some embodiments, the end-user device 1000 may comprise a single data-and-voice device, such as a smartphone. (See FIGS. 1, 2 and 4.) In other embodiments, the end-user device 1000 may comprise a separate voice device (such as a traditional landline telephone or a cellular phone) and a data device (such as a desktop computer, laptop computer, personal digital assistant, or other Internet connection enabled device such as Apple Computer's iPad and iPod). (See FIG.

3.) The use of a certain type of end-user device 1000 in any one of the exemplary architectures in FIGS. 1-4 is for explanation and example only and is not intended to limit the present invention. Those of skill in the art will understand that various end-user device 1000 options are compatible with various system architectures, and various methods, consistent with the present invention.

Figure 2:
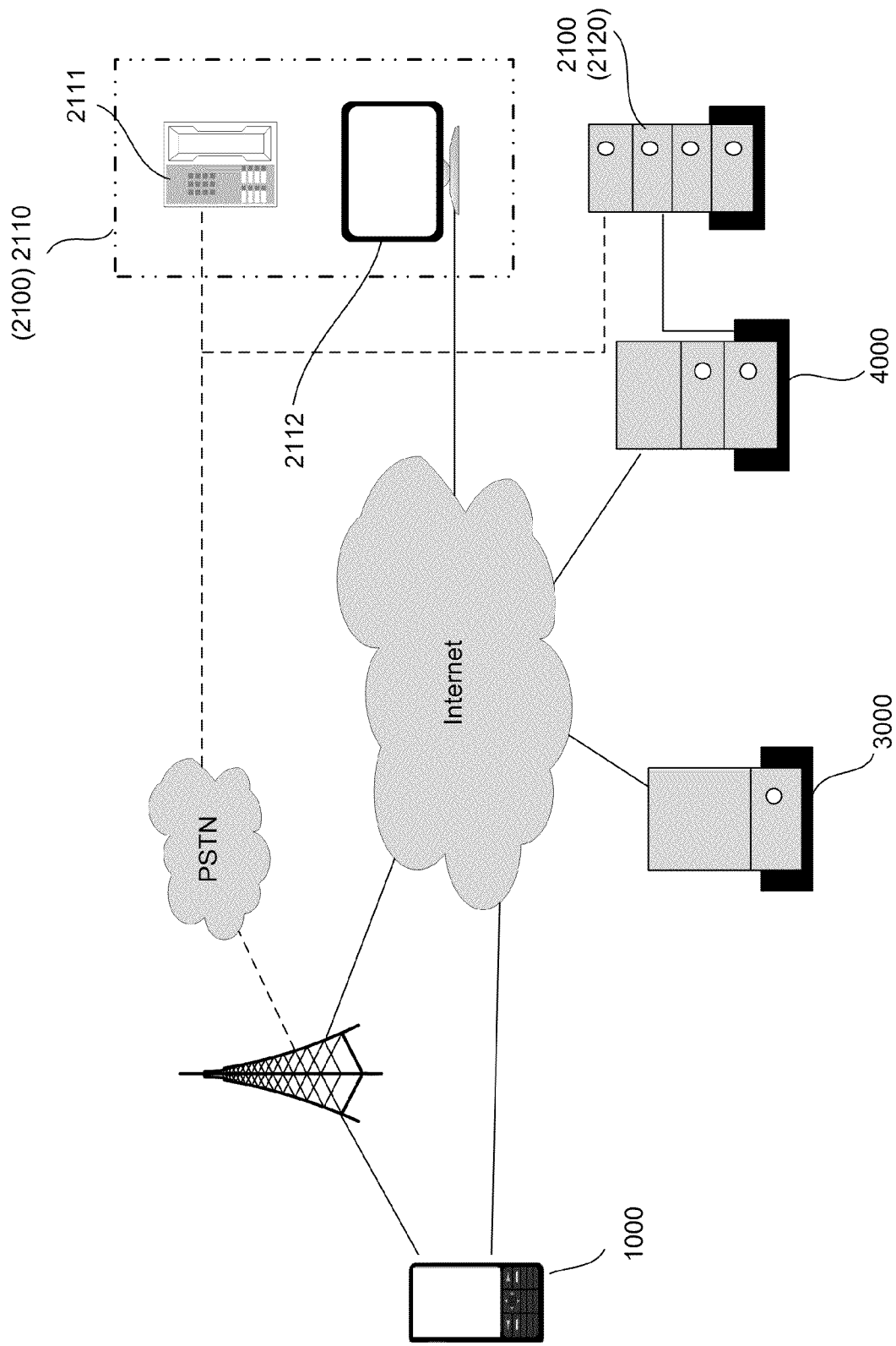
FIG. 2 illustrates another exemplary system for voice and data communication consistent with the present invention.

Referring to FIG. 2 as an example, in some embodiments the end-user device 1000 may be configured for voice and/or data communication over a cellular network, such as a Global System for Mobile Communication (GSM), general packet radio service (GPRS), enhanced data for global evolution (EDGE), code division multiple access (CDMA), or wide CDMA (WCDMA) system. In addition, the end-user device 1000 in FIG. 2 may also be configured for a wired Internet connection or wireless Internet connection through a local area network (LAN), such as through a 802.11 access device. In a preferred embodiment, the end-user device 1000 is capable of voice and data communication at the same time. Simultaneous voice and data communication may be accomplished by, for example, using a third-generation (3G) mobile device within a 3G network, or using a dual transceiver device for cellular voice communication at the same time as a wireless LAN connection. Other devices, such as Class A GPRS devices that allow GSM and GPRS service at the same time (whether using dual transceivers or using a dual transfer mode (DTM) feature) or devices that are capable of a wired Internet connection at the same time as a voice call, may also be used consistent with the present invention. It is noted, however, that simultaneous voice and data communication is not required. In some embodiments, as described in greater detail below, the end-user device 1000 may be used for only data communication during one period of time, and only voice communication during another period of time.

Figure 3:
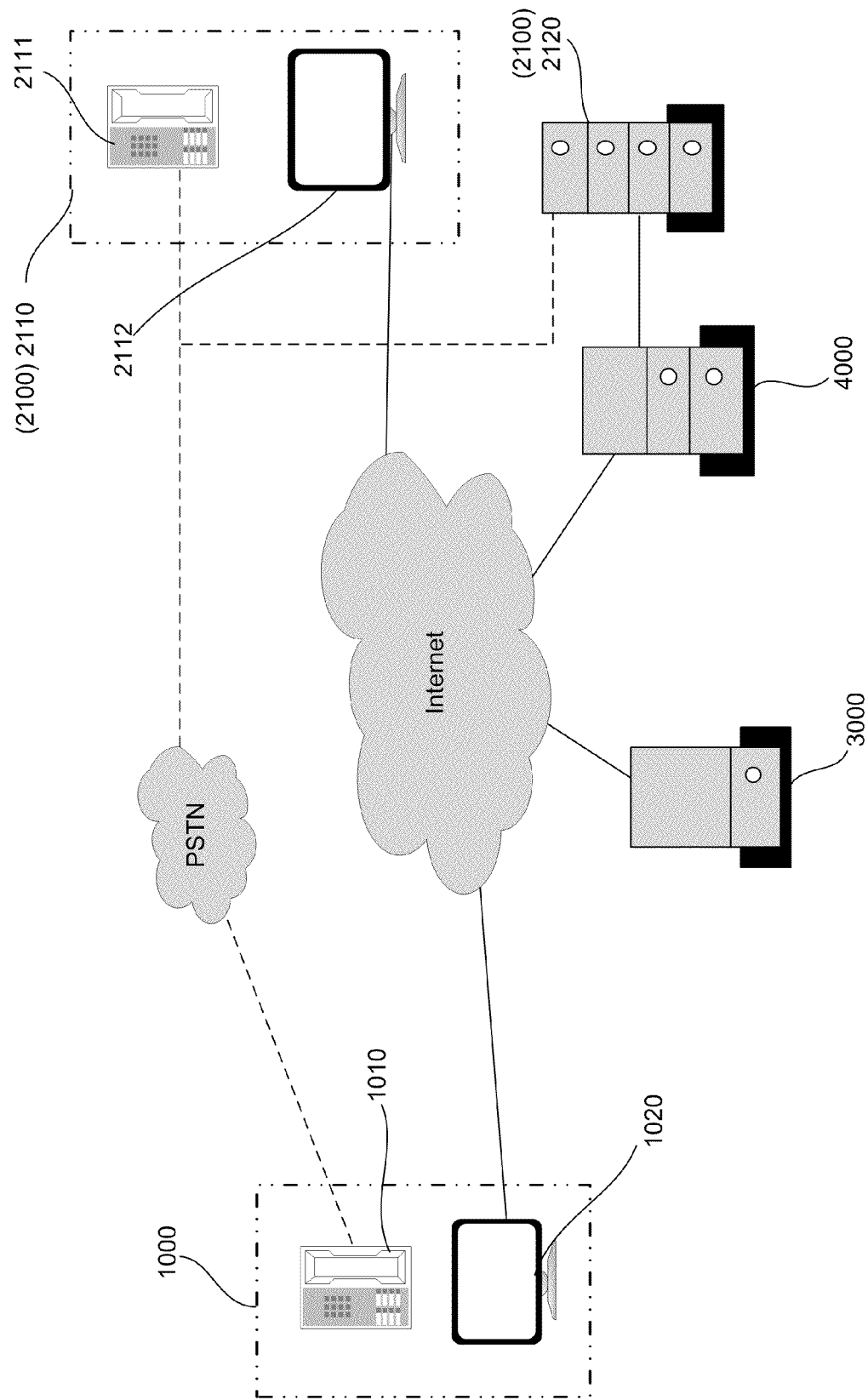
FIG. 3 illustrates an exemplary system for voice and data communication similar to FIG. 2, but wherein the end-user device comprises a separate data device and voice device.
Figure 4:
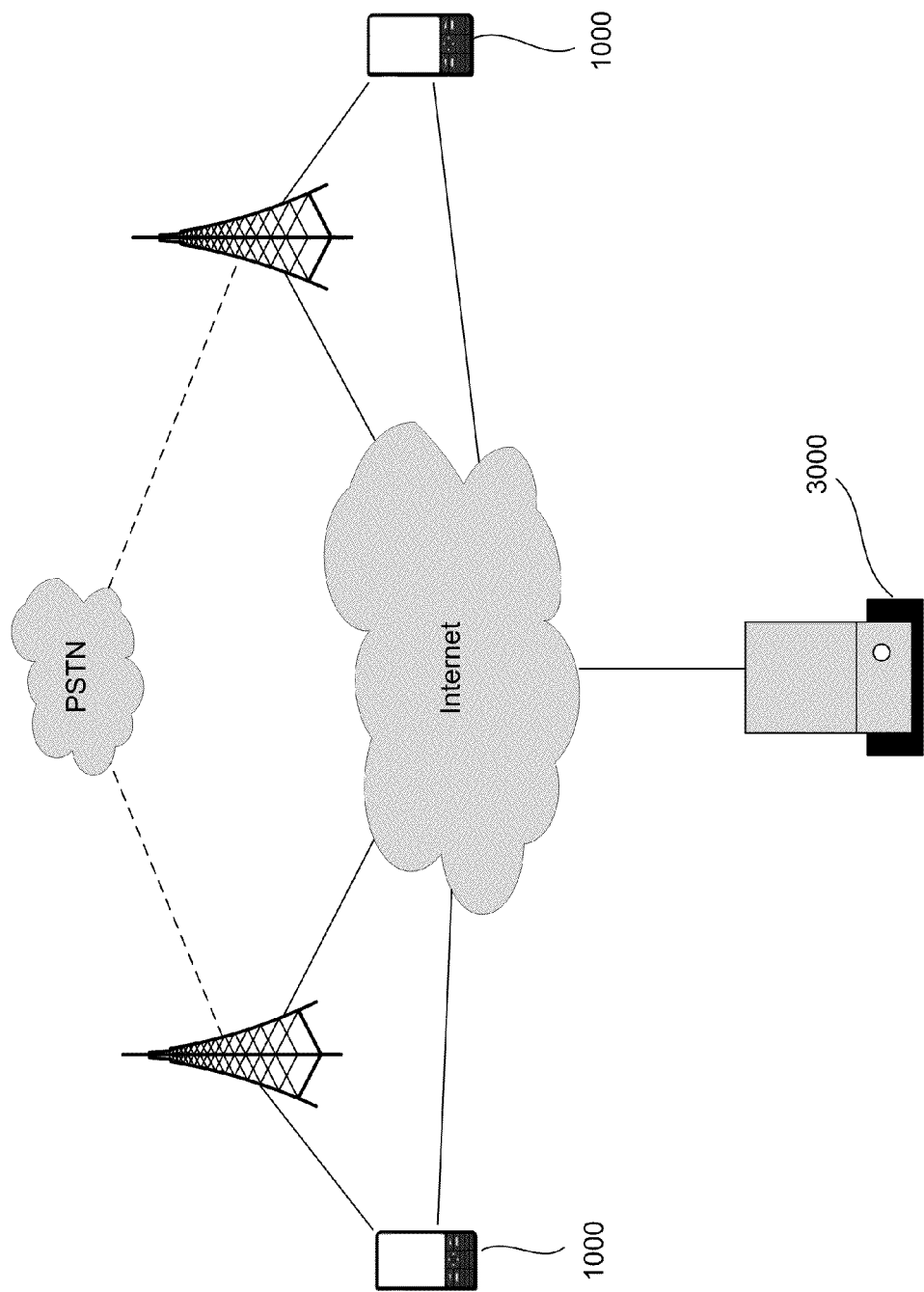
FIG. 4 illustrates an exemplary system for voice and data communication between user-devices consistent with the present invention.

FIG. 3 shows an embodiment similar to that in FIG. 2, except that the end-user device 1000 in FIG. 3 comprises two separate devices. As shown, a voice device 1010, such as a landline telephone, cellular phone, smartphone, etc., is used for voice communication and an Internet-connection-enabled data device 1020 is used for data communication. It is notable that the voice device 1010 may be capable of voice and data communication, but an end-user may prefer to use the separate data device 1020 for various reasons. For example, an end-user may have a smartphone that is configured for use consistent with the present invention, but the end-user may still elect to use a home computer for data communication because of the end-user's personal preference in ease of operation.

Figure 5:
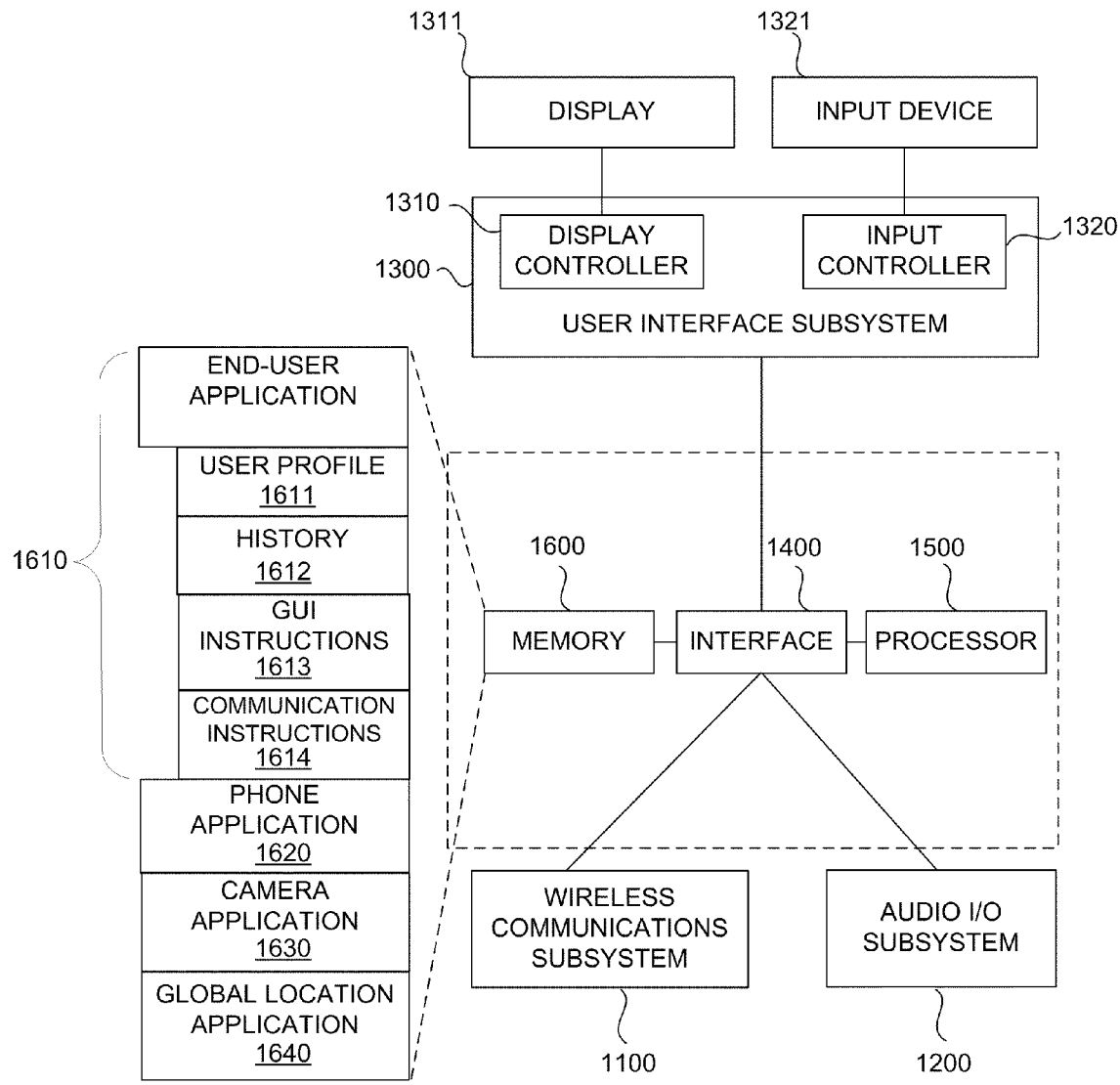
FIG. 5 illustrates a block diagram of a user-device consistent with an embodiment of the present invention.
Figure 6:
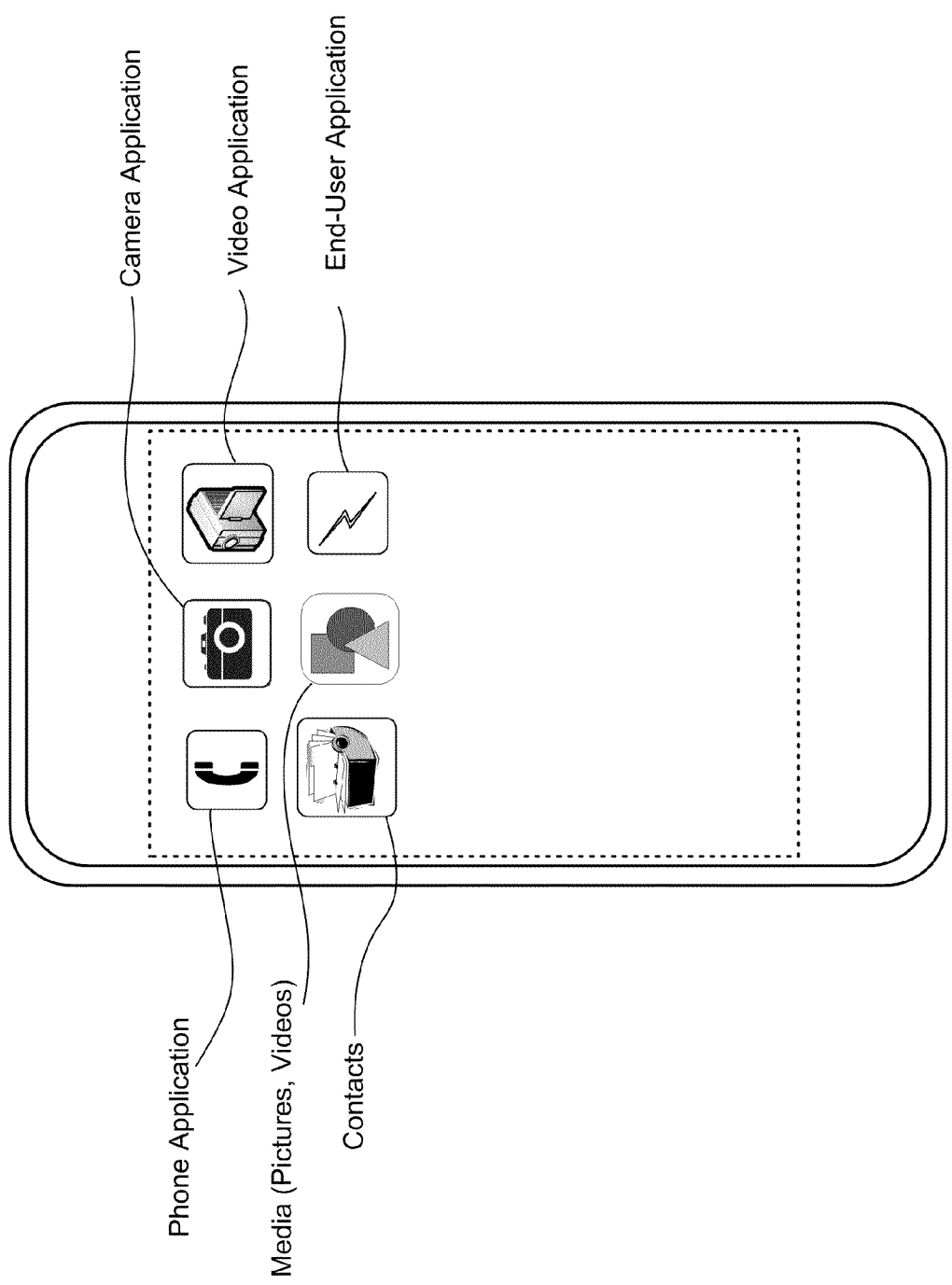
FIG. 6 illustrates an application view consistent with the present invention, wherein an end-user application is a selectable application on an end-user device.

FIG. 5 provides a block diagram of an exemplary smartphone that may be used as an end-user device 1000 consistent with the present invention. The end-user device 1000 in this embodiment may comprise a wireless communications subsystem 1100, an audio I/O subsystem 1200, and a user interface subsystem 1300 (including a display controller 1310 and input controller 1320), which are all connected to a processor 1500 through a main interface 1400. A display 1311 and input device 1321 are connected to the user interface subsystem 1300. It should be noted that the display 1311 and input device 1321 may be the same structure—such as a touch screen.

For purposes of the present invention, the end-user device 1000 may be modified to include an end-user application 1610 stored in memory 1600 which provides instructions consistent with the present invention. The end-user application 1610 may be one of many applications (e.g., phone application 1620, camera application 1630 and global location application 1640) on the end-user device 1000. In one embodiment, such as in FIG. 5, the end-user application 1610 may be loaded as an application ("End-User Application") on a smartphone. The end-user application 1610 facilitates receiving and displaying material from another user (e.g., an agent) and generating and transmitting material to the other user (e.g., menu selections or data entry in response to agent inquiries). In one embodiment, the material transferred may primarily consist of pages (referenced by URL), text messages and files, where pages and files may be HTML, PDF, JPG, Word, Excel, text, and other types. In one embodiment, the pages can be displayed within the session window and text messages can be displayed in a chat window.

Figure 7:
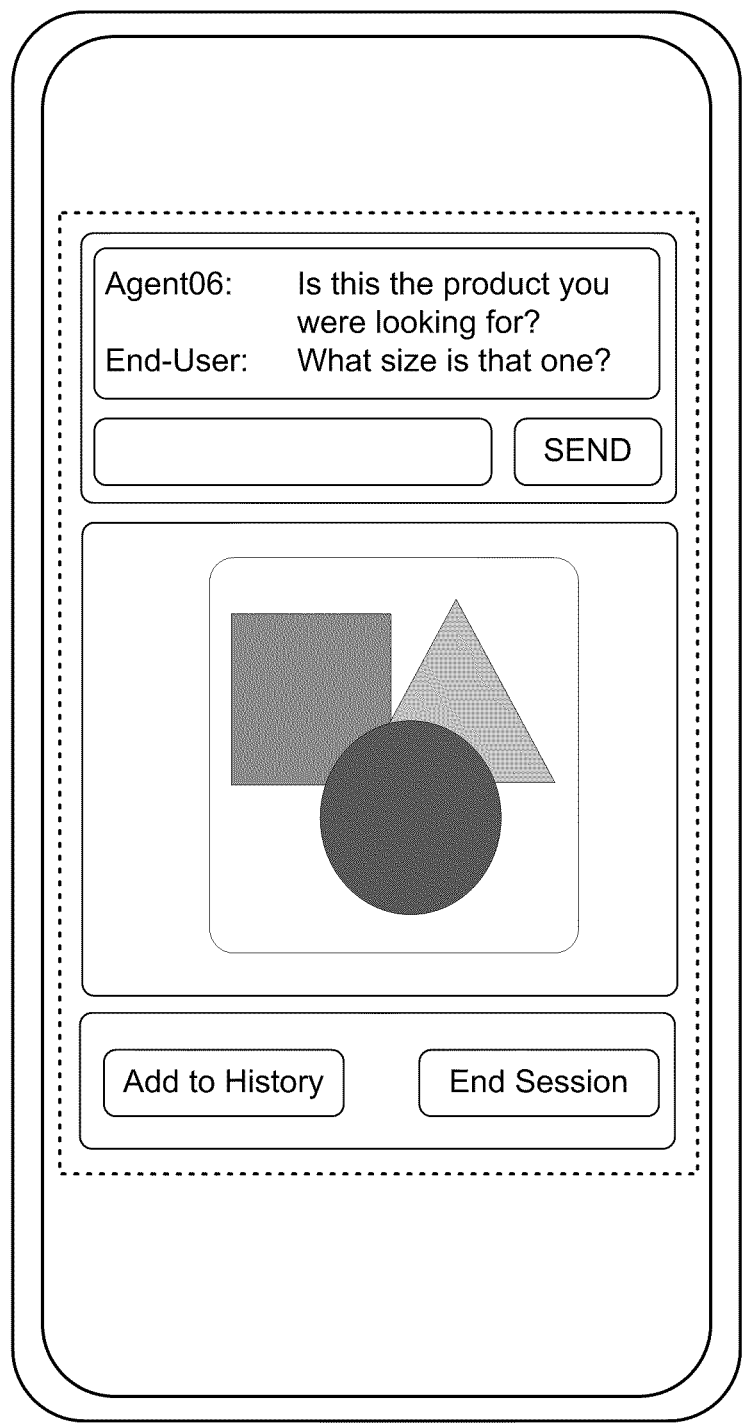
FIG. 7 illustrates an exemplary user interface view consistent with the present invention.
Figure 8:
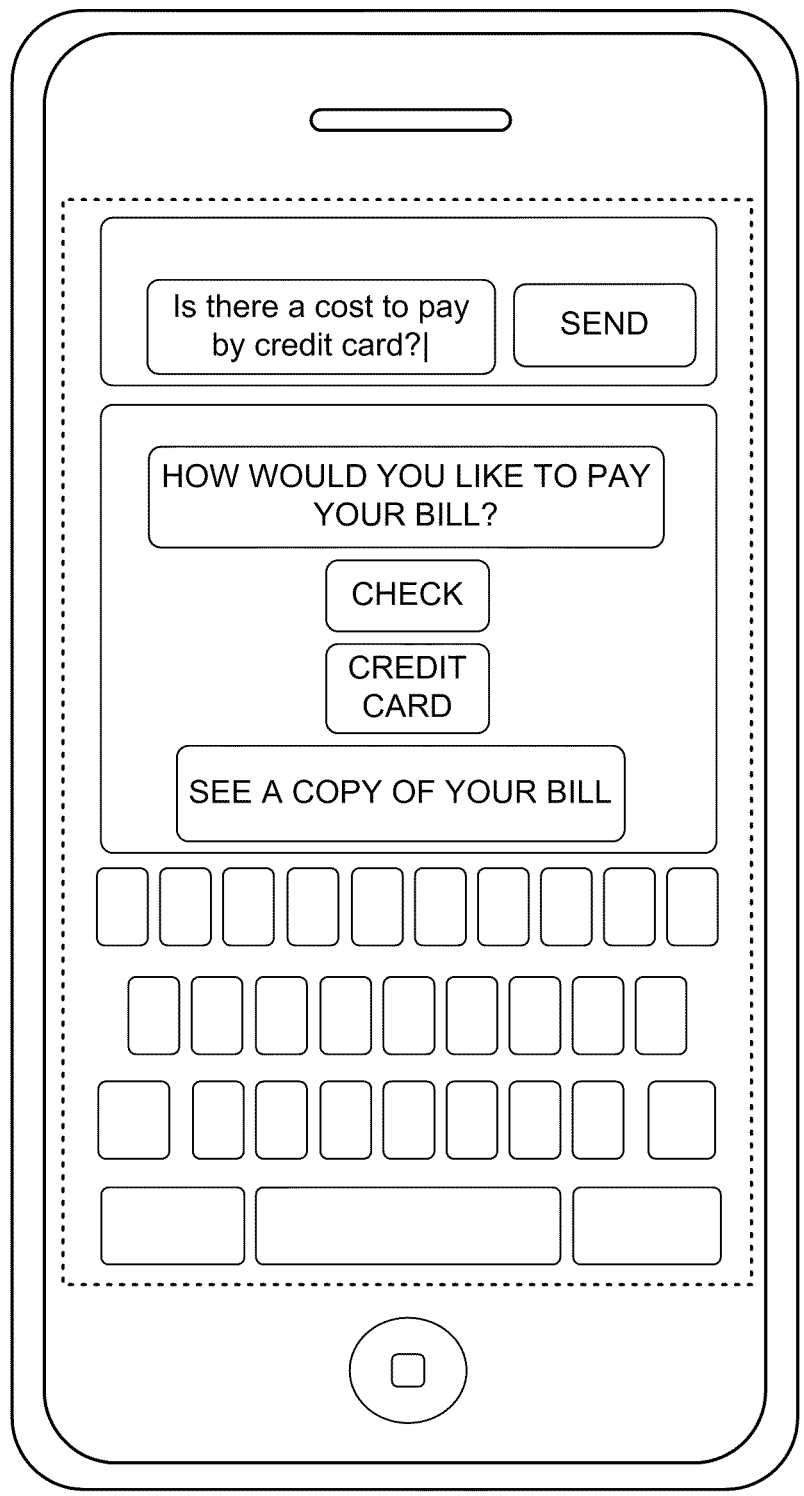
FIG. 8 illustrates an exemplary user interface view consistent with the present invention.

FIGS. 6-9 show exemplary embodiments of the present invention where a session window displays information received from an agent device 2100. In FIG. 7, a live agent has provided an end-user with an image of a product while simultaneously inquiring with the caller if it is the correct product. FIG. 8 shows menu elements received from an agent device 2100, such as an IVR 2120. For a touch screen end-user device 1000, the menu elements may be tappable menu elements. For a non-touch screen, the menu elements may be configured by the end-user application to be selectable using a physical user interface. In addition to menu elements, data entry fields may be present on pages sent from the agent, thus allowing the end-user to easily input information during the call. FIG. 8 shows an embodiment where the end-user has received menu elements about bill pay options and a menu element allowing the end-user to see a copy of the bill to make sure everything is correct before paying. Moreover, the chat or text features allow the end-user to send inquiries about the menu options the caller has been presented. Given the lack of a physical keyboard for this end-user device 1000, a touch screen keyboard may temporarily occupy a portion of the screen in order to allow the end-user to enter the text message.

Figure 9:
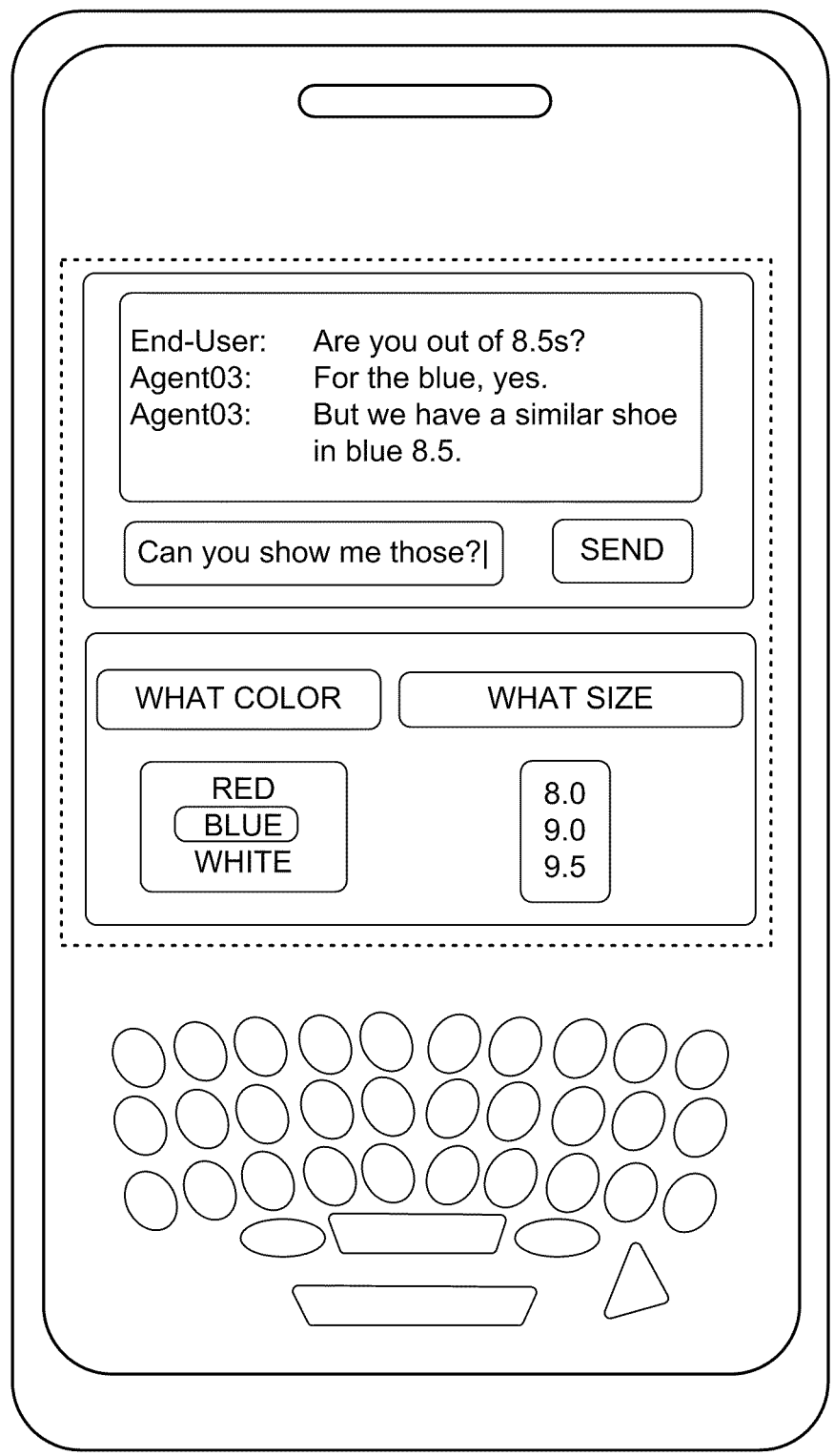
FIG. 9 illustrates an exemplary user interface view consistent with the present invention.

FIG. 9 shows another exemplary embodiment of an end-user interface. In this embodiment, an end-user could be communicating with a live agent for purchasing shoes. The screen may allow the caller to select certain options, or it may display options selected by the agent based on the conversation with the end-user. A text box can allow the end-user to ask questions, or the same questions could be made using a voice connection.

In some embodiments, material displayed during a session can be stored locally within the application for future reference using a History capability. This is especially useful when the call relays information that will be referenced at a later time. FIG. 7 shows a "Add to History" button that will allow the end-user to save the current image, document, etc.

Referring back to FIG. 5, the end-user application may comprise modules for handling these various functions. For example, a communication instructions module 1614 may be used to provide instructions for translating incoming data communications received by the wireless communications subsystem 1100 from the session server 3000, and for properly formatting any outgoing messages. The GUI instructions module 1613 may be used to provide instructions for displaying received information, and for processing responses received from the end-user. The history module 1612 may be used to store certain data from a data session, and the end-user profile module 1611 may be used to store information related to certain device users. The illustrated modules for the end-user application 1610 are exemplary only and are described according to function. The modules could be grouped differently, including combining some of the current modules into a single module, or further dividing the modules into several different software modules.

Agent Device Overview

Also shown in FIGS. 1-3 are agent devices 2100, including agent workstation(s) 2110 and IVR(s) 2120. An agent workstation 2110 may comprise a computer terminal 2111 and telephone 2112 for data and voice communication, respectively. Those of skill in the art will be readily aware of various agent workstation 2110 setups that may be used consistent with the present invention, including an integrated workstation where voice communication is directed through the workstation, and wherein the workstation operates with a headset or other audio input/output device. As is shown in the FIGURES, agent device 2100 may also include IVR(s) 2120, or voice response units, modified such that the IVR 2120 can also handle an interactive data session. In some embodiments, a session gateway 4000 is connected to the IVR(s) 2120, wherein the session gateway 4000 is used to provide an interface between the session server 3000 and the IVR(s) 2120. A session gateway 4000 may comprise an application running on an Internet server, wherein there is a session gateway 4000 for each IVR 2120. In this way, a single Internet server may include multiple session gateways 40000 to handle multiple IVRs 2120. Although the session gateway 4000 is shown as a separate device in the figures, the session gateway 4000 may also be incorporated as a software module within the session server 3000.

A unique connection protocol is employed as an element of the invention for establishing inter-process connections and conveying information between end-user devices 1000 and the session server 3000, between agent devices 2100 and the session server 3000, and between a session gateway 4000 and an IVR 2120. In an exemplary embodiment, this connection protocol makes use of TCP/IP to maintain compatibility with the Internet infrastructure and uses a dynamic socket approach to establish the connections. Within each connection, information is conveyed using various asynchronous control, status and data messages specifically defined to implement the various aspects of the system. For the interface between a session gateway 4000 and an IVR 2120, a single multiplexed connection can be used as the means to implement the numerous individual connections, each between a specific IVR phone port and its associated virtual agent device 2100 on the session gateway 3000.

Figure 10:
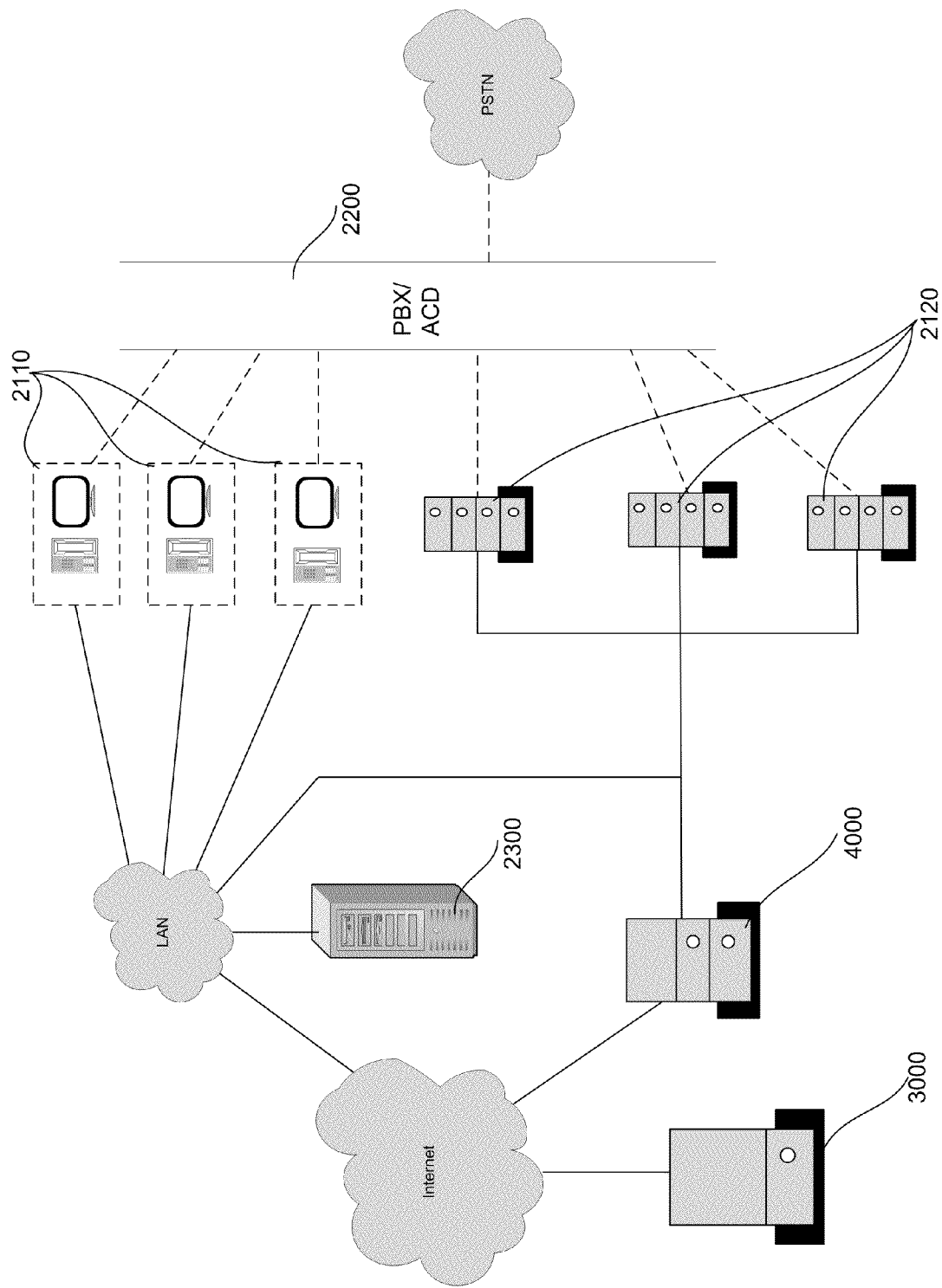
FIG. 10 illustrates a call center, or account side, infrastructure consistent with the present invention.

In FIG. 10 an exemplary call center infrastructure consistent with an embodiment of the present invention is shown. In FIG. 10 agent workstations 2110 and IVRs 2120 are connected to the PSTN through a private branch exchange (PBX) 2200 with automatic call distribution (ACD) functionality. In another embodiment, the IVRs 2120 and/or agent workstations 2110 may have trunk or line connections to the PSTN or other voice network. In addition to the voice communication, the agent workstations 2110 and IVRs 2120 are configured for data communication, and establishing a data connection, with a session server 3000. A call telephony integration (CTI) server 2300 is also shown. As is understood in the art, the CTI server 2300 may be used to collect information generated during a voice communication with the IVR 2120 and pass the information to a agent workstation 2110 during call transfer. In addition, in some embodiments of the present invention the CTI server 2300 may be used to collect information generated during a data session between agent device 2100 and end-user device 1000. Consistent with the present invention, many other call center technologies may be incorporated, and many changes and variations may be made to this exemplary system in FIG. 10.

For the agent workstations 2110, an agent application may be installed for use with the present invention. An agent application can offer a range of tools and interfaces to make information sharing as easy as possible. For example, in one embodiment the agent interface may comprise a session window that can be populated with information or can be moved as a frame to capture a portion of the agent's display. Anything being viewed by the agent in the session window can be sent to the caller by means of a button click or hot key. In another embodiment, the agent can capture and move visual content directly to the agent application from some other application or window on the agent workstation 2110 without employing a session window.

Ways for the agent to select and capture visual content to send to the end-user could include:

Selecting html, txt, pdf, image and other files from a predefined list.

Drag-and-drop of elements from scripts, documents, or other applications on the agent workstation.

Direct entry of a URL, text message or file name in the agent application.

Capture of a portion of or the entire screen of the agent workstation.

Agent-directed co-browsing if a web page with links is present on the agent workstation.

In addition, the agent application may allow an agent to move the session window as a frame to encompass a given portion of the workstation display and have a screen shot of that portion of the display captured and sent to the caller.

Each time information is sent to the caller by the agent, optional confirmation can be provided to the agent indicating that the information was received by the caller. If an agent wants to transfer the call to a second agent at a separate workstation, the first agent may return the session to a data structure in the session server 3000, allowing the second agent to retrieve it and re-establish the session. In another embodiment, session information may be provided to the second agent to join the ongoing session.

Other agent application features may include:

Automatic joining of data connection with incoming phone call.

Processing of context-specific client information to agent before answer.

Rolling session summary with session records.

Recovery of dropped data connections with session record to maintain end-user conversation.

A traditional IVR 2120 may be modified for use in the present invention by using a connection to a session gateway 4000 together with a software module on the IVR 2120. Such software module terminates the message protocol from the session gateway 4000 and provides a means for messages to/from the session gateway 4000 to be relayed from/to the call scripts which control the call flow for each individual IVR 2120 port. This embodiment shields the IVR 2120 from having to know the intricacies of dealing with the session server 3000 and end-user devices 1000. The existing call flow and script mechanisms in the IVR 2120 continue to be used and are augmented by visual content which can be delivered to end-users and data stimuli which can be received from end-users via the session gateway 4000.

In another embodiment, the IVR 2120 may be modified to directly communicate with the session server 3000. In this instance, the agent application on the IVR 2120 will be responsible for translating incoming and outgoing messages and integrating these messages with the voice call flow programming.

Session Server Overview

Also shown in FIGS. 1-4 and 10 is a session server 3000. The session server 3000 is configured to establish a data connection with end-user device 1000 and agent device 2100, and the session server 3000 is what allows for data communications between the end-user device 1000 and agent device 2100. Moreover, the session server 3000 can connect end-user device 1000 and agent device 2100 for a data session, wherein the end-user device 1000 and agent device 2100 can actively communicate over the data connection. Numerous types of data communications, including various types of data content (e.g., text messages, documents, images, videos, etc.), control messages, and system messages can be sent via the session server 3000. It should be understood that for an end-user device 1000 and/or an agent device 2100 with separate voice and data devices (e.g., where an end-user is using a cellular phone and a laptop computer, and/or an agent is using a computer terminal and landline telephone), the session server 3000 connects a data device portion of the end-user device 1000 (e.g., the laptop computer) with a data device portion of the agent device 2100 (e.g., the computer terminal).

Data may be relayed through the session server 3000 using a store-and-forward approach or a data-streaming approach. In a preferred embodiment, a data streaming method is used in order to increase the data transfer speed. The session server 3000 can allow one agent device 2100 to be connected to multiple simultaneous end-user devices 1000, as well as multiple agent devices 2100 to be connected with one end-user device 1000, and many-to-many sessions. This capability may be useful for presentation and training sessions involving multiple end-users or bridge-on of specialized agents or supervisors to handle complex client interactions. In some embodiments, the session server 3000 establishes a session but then is dropped from the connection and a direct connection is formed between the agent device(s) 2100 and/or end-user(s) 1000 (including a direct connection between end-users 1000).

In exemplary embodiments, the session server 3000 may include a data structure or data structures for indexing end-users and agents. For example, the session server 3000 may comprise a data structure for end-users (or end-user connections) and a data structure for agents (or agent connections). The end-user data structure may be indexed by the end-user phone number received in an end-user notification. The session server 3000 may use a target phone number (received in a session request from an agent device 2100) to locate the proper end-user to connect an agent to. Similarly, account devices (e.g., agents or agent connections) may be indexed in an agent data structure by account numbers. The session server 3000 may use an account number in a payload associated with an end-user notification to identify the proper account device(s) to send the payload to. In these exemplary embodiments, indexing the data structures based on information typically included in end-user notifications and/or session requests allows the session server 3000 to identify the end-user devices 1000 and agent devices 2100 to connect. A processor in the session server 3000 may be used to control the data structure.

Communication Protocol

An exemplary message protocols is provided herein. Those of skill in the art will recognize that this protocol may be changed and adapted consistent with the present invention.

The present example provides definitions for an exemplary message protocol that exists between end-user device(s) 1000, an agent device(s) 2100, a session gateway 4000 and/or a session server 3000. Some sample messages are included for reference purposes only. The prefix to every message is letter noted.

A Keep-alive message. A message needs to be sent within a specified number of seconds. If no message is sent, then a keep-alive message is needed to indicate that the end-user device and/or agent device is still active. If the message time limit is exceeded, the connection will be terminated.

B Agent display information for a connected, or recently disconnected, end-user. For example, payload information may be included in a text only format, where sent strings get concatenated on the session server for delivery to an agent.

C End-user information is requested/returned.
For example, the agent application requests the payload/end-user information from the session server using a session number and account number:

D This may be used for diagnostic information. A plain-text message format may be used wherein the session server may further attach date, timestamp, account number, and session number/end-user phone number to each message.

F File transfer. This message may be used to identify a file being transferred.

G Provides the session server with the 'display name' to be used by the agent.

H This message may be used to measure the turnaround time of a message from the session server to the client and then back again. When an end-user gets this message it should be sent back to the session server as soon as possible. The turnaround time is used to determine connection performance so that an agent device (such as an IVR) can adjust the timing of voice and data communications.

I Sent when an agent device (e.g., IVR) has ended a session. Closes a session, even if the end-user is only in a disconnected state.

K Primary session server login message, which may be used to obtain a unique session port for the session server connection.

L This message type may be used by an IVR to log into a session gateway and establish a valid socket connection.

N Network connection type (3G, EDGE, or WIFI) sent to the agent. The network connection type may be used in combination with the turnaround time message for timing purposes.

O This message may be sent to the session server to set up a session with an end-user, where the end-user has not specified an account number but has specified (via the agent) an end-user phone number.

P The unique session port to be used for the session's connection, as returned from the session server following a valid K message request.

Q A Q-type message may be used by the session server for reporting end-users in the data structure to agents with the associated account number. The states, or connection status, of the agent device may also be reported as 'active', 'waiting', or 'disconnected'.

R An R-type message may be used by a session gateway to request that a 'potential' incoming end-user be removed, or unassociated with the account number.

SStop This is a stop session message. This message may be sent from the end-user when a 'normal' termination is requested. This will remove the entire end-user's information from the session server.

T Plain text display data. Send by either the client or the agent and then displayed as a plain text message by the other end.

U URL of a valid Internet link. This may be sent by an agent and processed by the client as a browser item for display.

X Cancel session with specified end-user. This may be sent to the session server from the end-user application to remove the specified end-user from the current active session.

Z Session request. A Z-type message may be used by an agent application to request that the session server establish a session with a specified end-user.

S Messages:

Snn Numerous session server messages (where nn stands for a particular S message number) are defined. Such messages, which are sent from the session server to agent devices and end-user devices, are used to indicate changes in connection states, operational or message content changes, and other status changes.

Examples of Establishing a Data Session

In general, the present invention provides a novel system and method for establishing a data session between one or more end-user devices 1000 and one or more agent devices 2100. Both the end-user device 1000 and the agent device 2100 establish a connection with a session server 3000, and the session server 3000 then establishes a session between the end-user device 1000 and agent device 2100. The end-user device 1000 only establishes a connection with the session server 3000 when needed. This allows the end-user to establish a connection when desired, without having to constantly monitor for incoming pages or requests.

In order to establish the session, the session server 3000 receives an end-user notification that includes identifying information for the end-user device 1000, such as the end-user's phone number (or end-user phone number), and the session server 3000 receives a session request from the agent device 2100, wherein the session request includes information identifying the end-user device 1000 the agent device 2100 wishes to connect to. For example, in a preferred embodiment, the session request from the agent device 2100 includes a target telephone number which specifies a telephone number associated with the end-user the agent device 2100 wants to connect to. In one embodiment, the target telephone number may be (automatically) received by the agent as part of a voice call from the end-user. In another embodiment, the target telephone number may be transmitted by the session server 3000 as part of a payload. A payload is data that includes information related to the end-user, such as browsing history or other context information, that may be used to help control processing of the end-user. This will be discussed in greater detail below. By matching (i) the end-user identifying information from an end-user notification with (ii) the end-user identifying information from a session request (e.g., matching (i) the end-user phone number from the end-user notification with (ii) the target phone number from the session request), the session server 3000 can establish a session between an end-user device 1000 and agent device 2100. Additional features, options and exemplary embodiments are described in further detail below.

Data Session and a Voice Call

Figure 11:
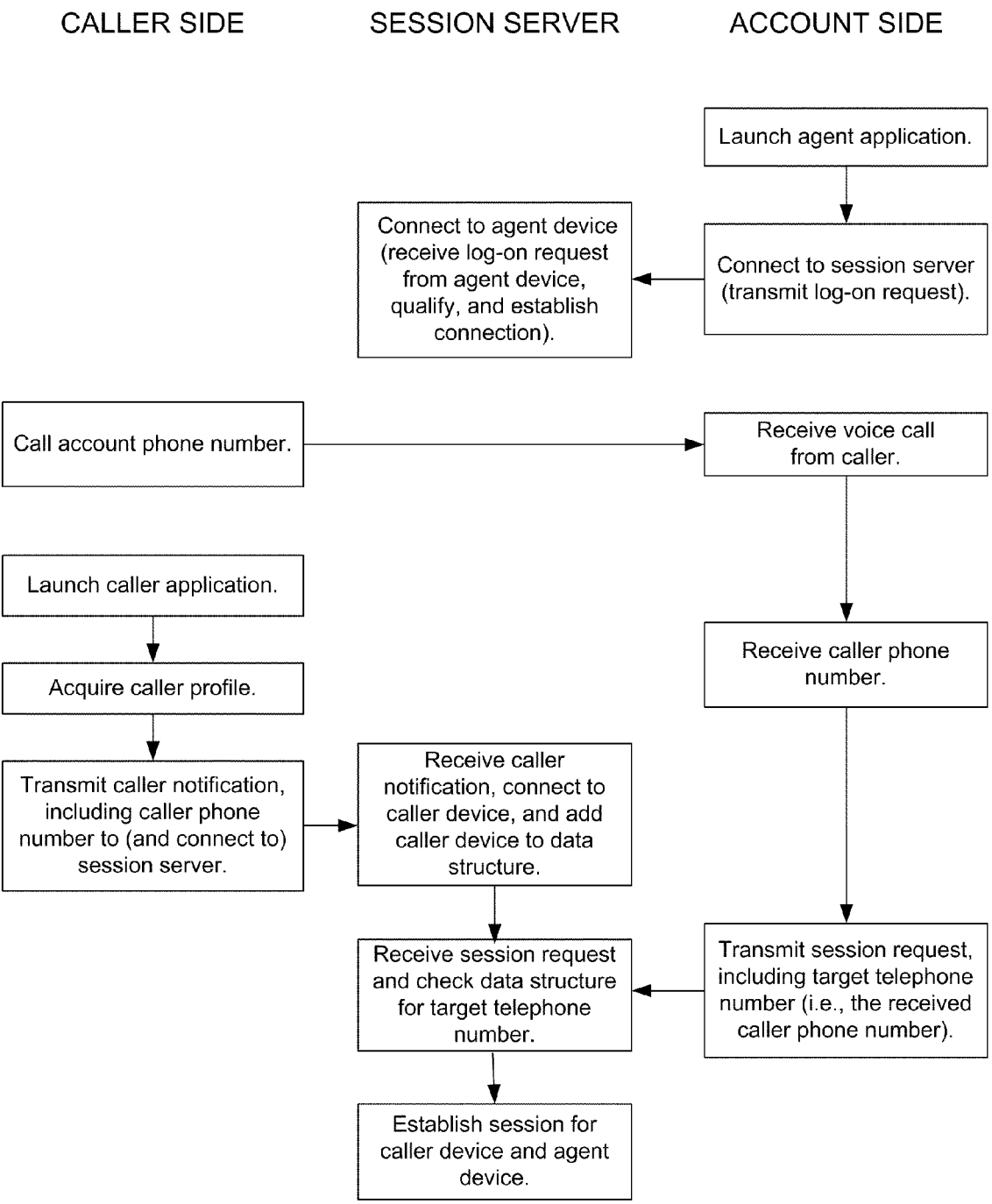
FIG. 11 illustrates an exemplary flow chart consistent with the present invention.

FIG. 11 is a general flowchart illustrating an exemplary method consistent with the present invention. The flowchart is arranged based on the perspectives of the end-user side (e.g., end-user device 1000), the session server 3000, and the account side or the agent side (e.g., agent device(s) 2100, call center infrastructure).

The account side is used to refer to the account devices that are associated with a certain account. For example, 'account devices' includes not only the agent devices 2100 that connect to the end-user, but also the other infrastructure that has been developed to handle call processing for a certain account. As used here, an account may represent a certain business, a business unit within a business, a specific product line within a business, etc. In one scenario, an account may represent an entire bank. In another scenario, a bank may have separate accounts for its mortgage business unit, its checking/savings business unit, and its credit card business units. In yet another scenario, a bank may have separate accounts for each of multiple credit cards it provides. For the voice call portion of a communication, certain dialed telephone numbers may be associated with the account in order to control voice-call processing. For the present invention, an account number may be used to identify the agent workstations 2110 with live agents specially trained for handling certain customers and/or the IVRs 2120 that have been programmed to process certain calls. A certain call center (and the account devices and agent devices 2100 included therein) may be associated with a single account or multiple different accounts. For example, an IVR 2120 may include programming such that it can handle voice calls and data sessions for various accounts. Similarly, live agents may be trained, and provided with call scripts, to handle multiple different accounts. Moreover, agent devices 2100 and live agents may be configured to handle multiple different types of inquiries for the same account (e.g., an account may include multiple different product lines which each require different call processing in an IVR 2120 or different treatment by a live agent). Put differently, for a single account an IVR 2120 may be programmed to handle various different types of voice calls and/or data sessions, and live agents may be trained, and provided with call scripts, to handle different types of end-user communications.

In order for the account side to establish a connection with the session server 3000, at least one account device needs to establish a connection with the session server 3000. In one embodiment, the agent devices 2100 will establish the connection to the session server 3000. In some embodiments, however, it may be preferential to have other account devices, such as a CTI server establish a connection with the session server 3000 in order to receive payload information that can be used to control processing of a voice call. For purposes of the exemplary embodiment in FIG. 11, an agent device 2100 is connected to the session server 3000. For this embodiment, an agent application on the agent device 2100 is launched. This could be in response to a live agent starting an agent application on an agent workstation 2110, or an IVR 2120 opening an agent application on the IVR 2120 during startup or in response to some external command. In some embodiments, the IVR 2120 may also need to establish a connection with the session gateway 4000. For each available phone port on the IVR 2120, there is an associated virtual agent device 2100 on the session gateway 4000 which interacts with the end-user device 1000 based on instructions from the IVR 2120. After the agent application is launched, a connection between the agent device 2100 and the session server 3000 can be established. In some embodiments, it may be necessary for the agent device 2100 to log-on to the session server 3000 in order to validate the agent device 2100 (this may include authenticating a live agent at an agent workstation 2110).

In the flow chart in FIG. 11, an agent device 2100 transmits a log-on request and connects to the session server 3000. In one example, the agent device 2100 and session server 3000 could establish a temporary connection such that login credentials can be transmitted to the session server 3000 and then authenticated by the session server 3000 before a connection is established. For example, in the case of a live agent, login credentials may comprise the live agent's username, real name, password, location, etc; and in the case of an IVR 2120, an agent profile may comprise a device name, account information, password, device type, etc. When the log-on request is transmitted to the session server 3000, the login credentials may be transmitted as well in order to provide information to qualify the agent device 2100 for connection. In another embodiment, the login request may be transmitted first and the session server 3000 may temporarily connect and interact with the agent device 2100 in order to request certain qualification information (e.g., the session server 3000 may send requests for a username and password and, after receiving responses, determine whether to connect to the agent device 2100).

Before, after, or during the time when the agent device 2100 is connecting to the session server 3000 an end-user may call an account phone number associated with the account side. This voice call may then be received by the account side for call processing. In a preferred embodiment, the end-user phone number will be automatically received by the account side. For example, the account side may automatically receive Caller-ID or ANI for the voice call. The end-user phone number may be automatically received by the agent device 2100 itself, or by another structure on the account side (such as a PBX/ACD) which passes the automatically received end-user phone number to the agent device. This may be done directly (e.g., PBX/ACD passes ANI directly to agent device when transferring call) or indirectly (e.g., PBX/ACD saves the ANI in a CTI server which associates the ANI with the voice call such that the agent device can acquire the ANI from the CIT structure separately). In other embodiments, the end-user phone number may not be received automatically but may instead be requested from the end-user. For example, if ANI was not received properly, or at all, an IVR 2120 may request an end-user to provide the end-user telephone number over the voice call (e.g., via DTMF or voice entry). A live agent may make a similar request and then input the end-user phone number into the agent workstation 2110. In some instances, the ANI received may represent a billing phone number for the end-user, but not the end-user (e.g., when the end-user is calling from behind a PBX). The account side may similarly be required to request the end-user phone number in such a case.

During, before, or after the voice call, an end-user application on the end-user device 1000 may be launched. The launch of the end-user application may be in response to the end-user starting the application, or the application automatically launching in response to an end-user's Internet browsing activity (described in greater detail below). After the initial launch of the end-user application, the end-user profile may be acquired. An end-user profile may be acquired in many different ways. For example, the first time an end-user uses the end-user application, the end-user may be asked to enter information to setup an end-user profile. During later uses, the end-user profile may be automatically acquired from memory. If multiple end-users use the same device (or if the end-user application is running on a data device that can be used by the same end-user from various voice devices with different end-user phone numbers), acquiring the end-user profile may include requesting that the end-user select an end-user profile from a menu of end-user profiles. In another embodiment, the end-user may be requested to enter some initial information which the end-user application can use to acquire the end-user profile. In yet another embodiment, the end-user application may automatically generate an end-user profile by acquiring a end-user phone number associated with the end-user device 1000 on which the end-user application is running.

An end-user profile is a collection of identification information for the end-user. A basic end-user profile may include only the end-user phone number. A more detailed end-user profile may also include name, address, end-user account information (e.g., the end-user's account number with certain businesses), credit card information, geographic location, etc. Additional information can be optionally assigned and designated by the end-user. In order to protect the end-user's privacy, certain information in the end-user profile may be protected (such as password protected) such that access may be controlled.

Once the end-user application is launched, an end-user notification, including the end-user telephone number, may be sent to the session server 3000. In some embodiments, the end-user notification may include additional information identifying the end-user and the end-user device 1000, including in some cases providing the end-user profile or a portion of the end-user profile. In additional exemplary embodiments, the end-user notification may further include information about the end-user device 1000 that may be used by the session server 3000 or the agent device 2100 to vary the information communicated to the end-user. For example, if the end-user notification specifies that the end-user device 1000 is a touch screen the instructions to the end-user may be different than if the end-user device 1000 does not have a touch screen. During the session, additional information, such as the data network being used by the caller and the round-trip delay on the connection, may also be provided. In one example, this information may be used by an IVR 2120 to adjust the timing of voice/data scripts. Once the end-user notification is received by the session server 3000, the session server 3000 can connect to the end-user device 1000 and add the end-user connection to a data structure in the session server 3000 (such as a data structure indexed by the end-user phone number). In the preferred embodiment, the session server 3000 can establish a persistent connection with the end-user device 1000.

Referring to the embodiment in FIG. 11, and turning back to the account side, after the end-user phone number is received by the account side an agent device 2100 may transmit a session request to the session server 3000. The session request includes a target telephone number, which is based on the received end-user telephone number (e.g., ANI, the number received from the end-user, etc.). When the session request is received by the session server 3000, the session server 3000 checks the data structure for end-users for an end-user device 1000 with an end-user phone number that matches the target telephone number. Once a match is located, the session server 3000 establishes a session for the end-user device 1000 and the agent device 2100.

In some exemplary embodiment, the session server 3000 may create a session identification for the session. In a preferred embodiment, the session identification may include information to allow the end-user device 1000 or the agent device 2100 to reconnect to the session if the end-user device 1000 and/or the agent device 2100 loses data connectivity. For example, if the end-user is using a smartphone and temporarily loses data connectivity, the session server 3000 could reconnect the smartphone to the agent device 2100 once the data connection is restored. In one embodiment, the session server 3000 will retain a session for two minutes before deleting the session information. In another embodiment, the session information may include other information about the session, such as session start time, end time, participants, how the session was established, volume of data transfer, etc., which may be logged and used for use metrics and/or billing purposes (e.g., to allow accounts to be billed on a use basis).

A session may be terminated in various manners. For example, a session may time out due to either the agent device 2100 or the end-user device 1000 being disconnected for a certain period of time (e.g., more than two minutes). In addition, the session may be actively terminated by either the end-user device 1000 or the agent device 2100. In one embodiment, the end-user device 1000 and/or the agent device 2100 may include an option that allows for terminating the session. Typically, this allows the agent to end the session once the voice call and data session are complete.

In one exemplary scenario, an end-user on a landline telephone may call to order a product out of a magazine. The call is delivered to a call center where it is received by a PBX/ACD and placed in a queue. The end-user phone number is also received by the call center and associated with the call. When a live agent is available, the call is transferred to the live agent with the end-user phone number. Either the live agent or the end-user may ask about the ability to start a data session with the call. In this scenario, the end-user must launch the end-user application from a data device, such as a home computer. In a scenario where the end-user called from a device that was capable of voice and data, the end-user could launch the end-user application from the phone. Once the end-user launches the end-user application, the end-user application might ask the end-user to enter the phone number for the device he is using, or select an end-user profile that already has this information. After the end-user application knows what end-user phone number the end-user is using, an end-user notification can be transmitted to the session server 3000.

During, after, or before the end-user notification is sent, the live agent can initiate the agent application to send a session request to the session server 3000. Before sending the session request, the live agent could confirm the end-user phone number which was automatically received, ask for the end-user phone number and manually enter it, or just send the session request based on the automatically received ANI. In this scenario, it is presumed that the agent workstation 2110 was already connected to/logged into the session server 3000. After the session server 3000 has both the end-user notification (and is connected to the end-user device 1000) and the session request (and is connected to the agent device 2100) the session server 3000 can establish a data session by matching the end-user phone number and the target phone number.

Once the session has been established, both the end-user and the live agent can use the session to share data and improve call processing. For example, the original purpose for the call in this scenario was the end-user's interest in ordering a certain product. The live agent could provide images of the product to confirm that s/he is placing the proper order on behalf of the end-user. Moreover, the live agent may send certain inquiries over the data session and receive end-user responses in that fashion, rather than the live agent having to verbally inquire and manually enter all responses. In addition, the data session may be used to display advertisements for related products or services that might interest the end-user given the current purchase. Once the order is finished, the data session may be further used to automatically transmit an ordering receipt to the end-user. The end-user could then save this receipt. For end-users concerned with sharing their email with companies, the data session will allow for the end-user to receive certain documents and other files without having to share anything more than the end-user phone number (which is generally shared automatically just by making the call).

Transmitting Payload for Improved End-User Processing

Figure 12:
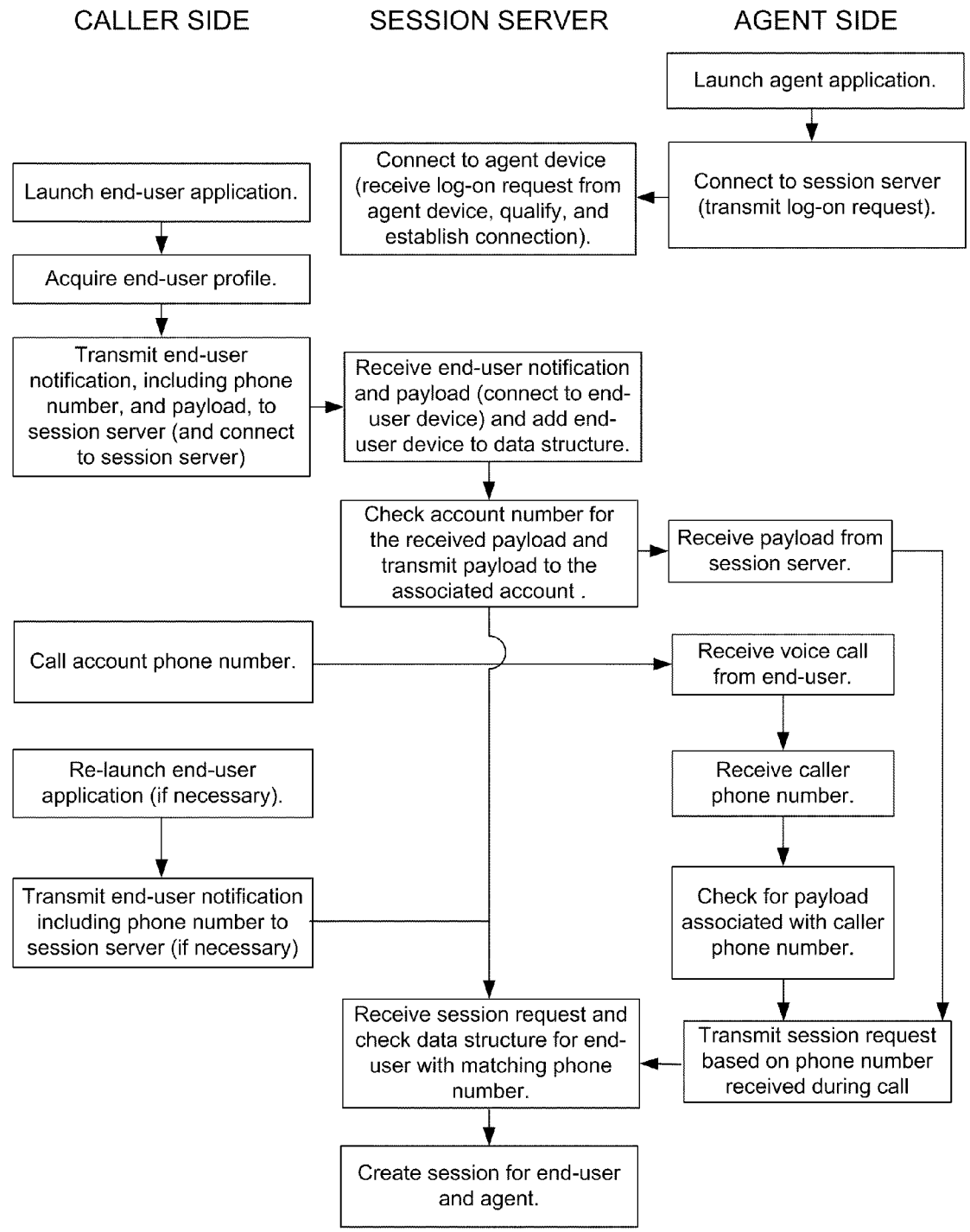
FIG. 12 illustrates another exemplary flow chart consistent with the present invention.

Now referring to FIG. 12 there is an exemplary flow chart consistent with another embodiment of the present invention. Similar to FIG. 11, FIG. 12 shows a flow chart for an agent device 2100 connecting to a session server 3000. In this embodiment, however, the launch of the end-user application, acquiring the end-user profile and the initial transmission from the end-user device 1000 to the session server 3000, differ in that a payload is also included. A payload is data that includes information related to the end-user, such as browsing history or other context information. In addition, the payload includes an account number. When the session server 3000 receives the payload, the session server 3000 checks the account number and then transmits the payload to the proper account (this may include transmitting the payload to an IVR 2120 or agent workstation 2110, or transmitting the payload to a CTI server or other device which could store the payload for later association with a voice call from the end-user). In this embodiment, because the session server 3000 knows what account the end-user notification request relates to, the session server 3000 can deliver the end-user notification and payload to a group of IVRs 2120, or workstations 2110. In this case, one particular agent device 2100 can then select the end-user notification. In one scenario, the agent device 2100 that selects the end-user notification (e.g., "picks up" the data session) may be the agent device 2100 that is selected to receive the voice call. In another scenario, the earliest available agent device 2100 will select the end-user notification and then inform the PBX/ACD to route the incoming voice call to it. When an agent side receives the payload, the payload can be associated with the end-user phone number. The association between the payload and the end-user phone number enables many different uses. For example, an agent device 2100 may transmit a session request with a target phone number matching the end-user phone number to the session server 3000. If the end-user is still connected to the session server 3000, or if the end-user has not been disconnected from the server for too long a period, the session server 3000 can establish a session for the agent device 2100 and the end-user device 1000. If the end-user is temporarily disconnected, the session server 3000 can connect the end-user device 1000 to the session once the end-user device 1000 regains data connectivity and connects to the session server 3000. Establishing a data session with the end-user before the voice call has been received may allow for some preliminary processing of the end-user even before any voice call connection. Moreover, the data session may be used to do preliminary processing while an end-user's voice call is on hold waiting for the next available live agent.

In another embodiment, the payload may be stored until the voice call is received. Once the voice call is received, the payload may be associated with the voice call in order to control call processing. For example, information in the payload may be used to determine whether to route the call to an IVR 2120 or to a live agent. Or the payload may be used to select a call flow within an IVR 2120. Here, selecting the call flow refers broadly to the ability to select a starting point within a call processing program on the IVR 2120. For example, rather than starting the end-user with general prompts used to determine the reason for the end-user's voice call, the payload could be used to bypass those initial prompts and start the end-user with a menu that more specifically addresses the purpose of the end-user's call.

For example, in one embodiment consistent with the present invention an end-user may be browsing a website for a desired product. If the end-user has a question about the product, or wishes to order the product, the end-user can click on a provided account link on the website which causes the end-user application to launch, acquire end-user profile information (such as end-user phone number), and transmit a data packet with information about the website the end-user was viewing (the payload) and an end-user notification to the session server 3000. In this scenario the payload includes an account number associated that identifies the call center and account devices that handle voice calls and data sessions for the website the end-user was viewing. In some scenarios, the company that runs the website may be different than the company that sells and distributes the product the caller is interested in. In such a scenario, the account number may identify a call center and account devices that handle voice calls and data sessions for the product the end-user was viewing. The session server 3000 may use this account number in order to transmit the payload to the associated account (e.g., the account which handles calls for that website, or the account that handles calls for the product).

If the end-user is on an end-user device 1000 that supports both voice and data connectivity, the account link may further cause the end-user device 1000 to dial a certain account phone number. For some devices, this may require that the end-user device 1000 terminate the end-user application in order to call the account phone number. In other devices, the end-user application may continue to run while the end-user device 1000 calls the account phone number. In further devices, the end-user application may need to be only temporarily terminated while the voice call is initiated but may be re-launched. In yet other embodiments, where the end-user device 1000 comprises a separate data device and voice call device, the end-user application may provide the end-user with a phone number to call using the voice call device.

In further exemplary embodiments, a data session can first be established between the end-user ### and the agent device 2100, and then the agent device 2100 can initiate a call to the end-user. The initiation of the call may be automatically performed using the end-user phone number received from the session server 3000. Or the initiation of the call may be manually performed by a live agent at an agent workstation 2110.

Returning to the scenario where the end-user calls the agent side, when the voice call is received by the agent side, the end-user telephone number received with the voice call may be used to determine if a payload is available for the end-user. In the preferred case, the end-user phone number associated with the voice call is automatically determined (such as through ANI) so that the payload may be used to immediately control processing of the call. For example, if the product the end-user was viewing was a high-end product, the customer could be routed to live agents specially trained for preferred customers. Alternatively, the end-user voice call may be delivered to an IVR 2120 where the payload is used to select the call flow for the end-user. For example, rather than the call flow starting by asking which product the end-user is interested in, the IVR 2120 would already know which product the end-user is interested in and could select a call flow that starts with cues and messages directed at the product the end-user was viewing on the website. By selecting this starting point, the IVR 2120 selects a call flow which saves time for the end-user and saves IVR 2120 call processing time.

In the case where simultaneous voice and data are not possible, the end-user side and agent side will still benefit by improved call processing due to the payload which was delivered to the agent side through the session server 3000. In the case where simultaneous voice and data are possible, the end-user phone number can also be used to establish a session with the end-user device 1000. The session may be used to direct menu selections to the end-user, show the end-user additional information (such as additional pictures about the product from the website), etc. If the call is transferred to an agent workstation 2110 the agent workstation 2110 may be provided with the end-user phone number such that the agent workstation 2110 can be connected to the session. In such instances, the session may have further advantages of allowing the end-user to enter sensitive information (such as social security numbers, credit card numbers, health information, etc.) into the phone so that the end-user does not have to verbally share it with the live agent. Moreover, the live agent will be equally (and probably more) capable than an IVR 2120 at providing visual information the end-user is interested in.

While the product website example discusses providing an account link on a website, the account link has numerous other uses and implementations. For example, advertising materials, bills, and other files may be provided to potential consumer with embedded account links (e.g., hyperlinks) that allow an end-user to initiate a call to the account while also transmitting a payload to the account which may be used to control the processing of the call. For example, many modern customers who receive their bills by email may be provided a bill with an imbedded "Pay My Bill" account link which automatically directs the end-user to the proper phone number, and transmits a payload to (the session server 3000 and then to) the account such that when the voice call is received, the agent device 2100 can process the call more quickly (e.g., put the end-user directly into the bill pay portion of the IVR 2120 script, or direct the end-user immediately to live agents that help with bill pay). Similarly, a PDF advertisement promoting certain Mother's Day Flower Bouquets may have an embedded account link for each bouquet that when clicked causes the end-user device 1000 to send a payload and dial a specific telephone number associated with the advertisement. Both the specific telephone number and the payload may then be used by the account to make call processing more efficient.

In yet another embodiment, an end-user could be provided with a confirmation email after ordering a product, where the email includes a "Check on the Status of My Order" account link. In this embodiment, the payload may be used to direct the voice call to a live agent specially trained for handling status checks. Moreover, the payload may allow the live agent to access the particular end-user's order status and send an update to the end-user, via the data session, all before the voice call starts. If the order is a special order, the customer service agent may be able to show the end-user pictures or other documents to ensure the end-user is happy with the order status. If the end-user wishes to save the files for later use or for records keeping, the end-user application may be used to save files, screen shots, and other information shared during the session.

It may also be noted that an end-user device 1000 may use different data connection paths during different periods (during this and other examples). For example, an end-user on a smartphone may browse the Internet using a local Wi-Fi connection and click on an embedded account link for a certain product. As discussed above, the account link can cause the end-user application to launch and transmit the end-user notification and payload to the session server 3000 using the Wi-Fi connection. After the notification and payload have been sent, however, the smartphone may switch to a cellular based connection for making the voice call and may also switch to the cellular connection for establishing, or re-establishing, a connection with the session server 3000.

IVR Connection

Figure 13:
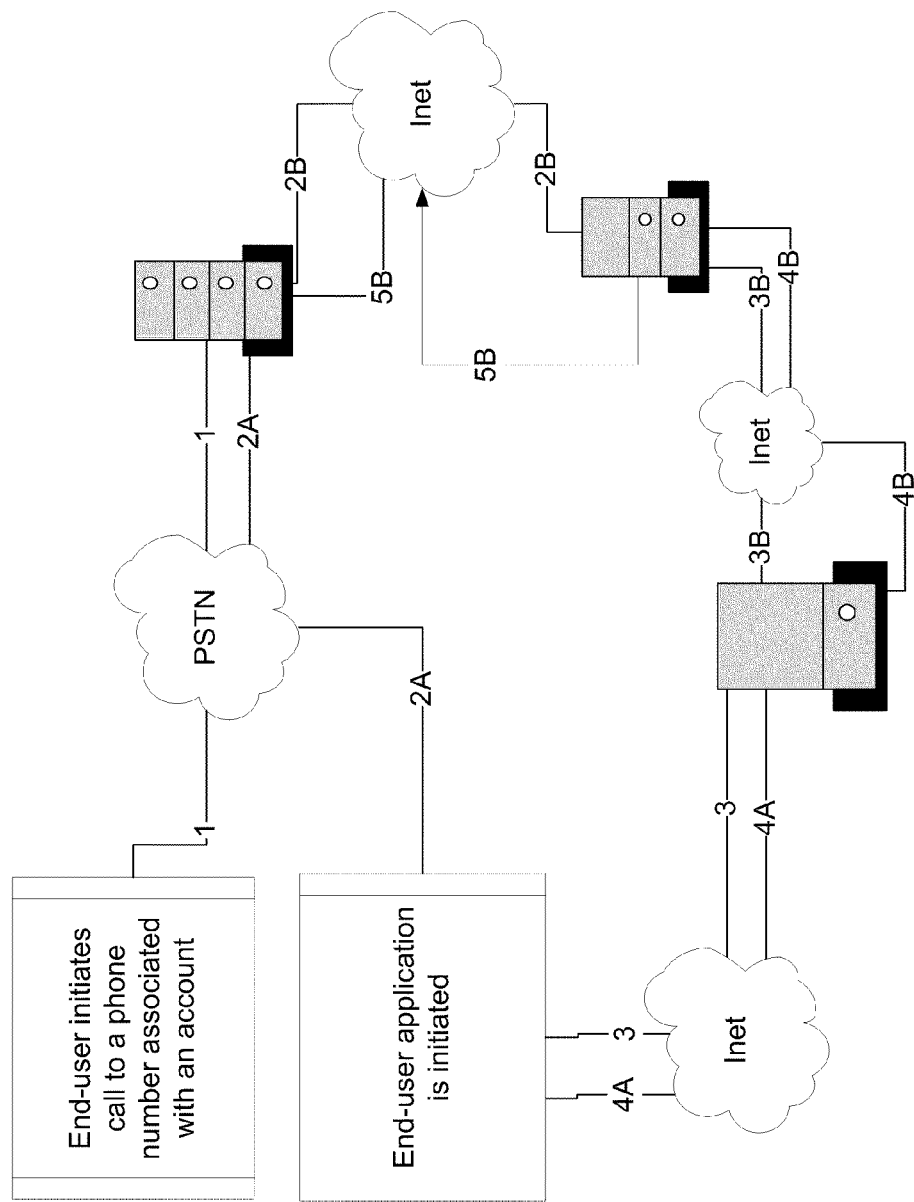
FIG. 13 illustrates a flow diagram consistent with the present invention.

FIG. 13 shows yet another embodiment of the present invention showing various possible communications between an end-user 1000, a session server 3000, an IVR 2120 and/or a session gateway 4000. In STEP 1 the end-user initiates a call to an account phone number associated with IVR 2120 and the call is delivered (via a PSTN or other voice-network) to the IVR 2120. In STEP 2A the IVR 2120 transmits certain voice messages to the end-user (via a PSTN or other voice-network). For example, the IVR 2120 may transmit a welcome message and initial cues prompting the end-user to identify whether the end-user is interested in a data session to accompany the voice call. In another example, the IVR 2120 will not check with the end-user but instead will automatically check with the session server 3000 to see if a data session connection is already available without needing to inquire with the end-user.

In STEP 2B the IVR 2120 may notify the gateway of the incoming call. In some embodiments, this notification may comprise a session request which includes an account number associated with the call (e.g., determined by the DNIS for the call) and a target phone number for the call (e.g., determined by ANI for the call). In STEP 3 (which may take place before or after the other steps) the end-user device 1000 sends an end-user notification to the session server 3000, including the end-user phone number associated with the voice call with the IVR 2120. In one example, STEP 3 may be in response to the communication from the IVR 2120 in STEP 2A. In another example, STEP 3 may be performed before the call is initiated in STEP 1. In response to STEP 3, the session server 3000 and end-user device 1000 may establish a connection that can be added to a data structure in the IVR 2120.

In this embodiment, at STEP 3B the session gateway 4000 relays the session request from the IVR 2120 to the session server 3000. In some embodiments, the session gateway 4000 and the session server 3000 may have a multiplexed, persistent connection. The session server 3000 may match the target telephone number in the session request with the end-user telephone number from the notification request (such as by comparing entries in data structures for end-user devices 1000 and agent devices 2100). After matching the end-user connection and session request, in STEPS 4A and 4B the session server 3000 reports back a message to the end-user device 1000 and the session gateway 4000 (which in STEP 5B reports back to the IVR 2120), wherein the message indicates a session has been established. After the session has been established, the IVR 2120 and end-user may engage in linked communications over the PSTN (voice) and through the session server 3000 (data).

In some embodiments, it may be preferential for the connection performance to be assessed. On mobile devices, there are wide differences in performance between WiFi and 3G connections, sometimes as great as a factor of 14 in turnaround times between agent device 2100 and end-user device 1000. To compensate for this, an embodiment of the invention is to assess connection performance and provide such information to both live agents and IVRs 2120. Especially in the case of IVRs 2120, timing is critical between stimulus generation by an end-user and receipt of the response, which is typically a visual display sent from the IVR 2120.

In one embodiment, the connection performance is assessed in two ways: (1) obtaining the connection type from the end-user device 1000 (e.g., WiFi or ATT) through use of a defined message and (2) by automatically sending a short text message, or series of short text messages, from the session server 3000 to the end-user device 1000 and back, and determining the turnaround time.

Both parameters are made available to the agent side so that agent applications can adjust their capabilities to the connection performance of the end-user device 1000. For live agents, the parameters are displayed together with other payload data. For IVRs 2120, the parameters are passed from the session gateway 4000 to the IVR 2120 and are used by the IVR 2120 to adjust speed of response and timeout intervals and anticipate content delivery performance to the end-user device 1000. For example, in order for the IVR to properly coordinate voice messages and data messages, the IVR must be able to determine a delivery time (the time it takes for a message to be delivered to an end-user device). This need not be an exact determination, but instead is a sufficient approximation in order to better coordinate and time messages. In another example, the agent device may adjust the communication capabilities (e.g., the types of data messages that can be sent, the amount of messages that can be sent, the expected response time for messages, etc.) based on the performance of the session.

Once the session is established, the end-user may use the defined protocol to send data messages (such as selected menu elements or content of data fields) to the IVR 2120 via the session server 3000. The session server 3000 forwards these messages to the session gateway 4000, where the messages and their content are processed and appropriate information is relayed to the IVR 2120 in the message protocol for the IVR 2120.

The IVR 2120 may then analyze the data (in view of any communications over the PSTN) and respond with a data message to the end-user device 1000 (such as further inquiries, instructions, or information). In sending the response, the IVR 2120 will send data instructions and/or display content to the session gateway 4000. This may be done using XML requests readily available for standard IVR 2120 software techniques. The data instructions and/or display content may then be processed and sent to the session server 3000 using the defined protocol. The session server 3000 will use its existing software (modified for multiplexed operations) to forward messages to the end-user.

INDUSTRY APPLICATIONS

The methods and systems described herein have numerous industry applications and uses. While some of these uses are described herein, additional examples will be understood by those of skill in the art based on the present disclosure. By way of example only, the following are some examples of how embodiments of the present invention may be used to improve all kinds of transactions between information providers and end-users.

e-Commerce.

By definition, consumers are interested in buying products and services and are often interested in communicating with a sales representative for making purchases. By tapping an account link on a website, an end-user can be transferred to a live agent along with payload information identifying the context of the call and/or information related to the caller. The sales representative knows how to answer the call, can more likely close the sale, and has an easier time upselling through the use of visual information. The agent can send a coupon to be used online or in a store in order to build customer satisfaction, loyalty, and sales of slow moving inventory.

Technical Support.

Technicians and other end-users in the field at times need complex information including diagrams, schematics, and detailed installation instructions. Especially in a situation where Internet access is not available or inconvenient from a computer, a voice call can be initiated from a smartphone or mobile device to a Technical Support center that can establish a data session. The data session can be combined with the voice call in order to provide additional data files, visual guides, instruction sheets, etc. In some embodiments, a smartphone or mobile device may have a specific support application that creates a data session and voice communication consistent with the present invention. In other embodiments, a user may be able to go to a support link (an account link) on a company's website in order to initiate a technical support call and data session. In embodiments where a payload is transferred to the technical support center, the information may allow the live or automated agent to answer the call appropriately. The agent can then sends files, diagrams, and visual instructions to assist with installation, troubleshooting, and service. The combination of both voice instructions and visual information can allow for more efficient and accurate support operations.

Customer Support.

Customers are the most important asset of any business. Whether seeking order status, answers to questions, resolution of problems, additional purchases, or other service information, customers require attention. By providing visual information along with a voice or text only support call, the present invention provides a cost-effective approach to support customers that stimulates repeat business and referrals. Needed information is more quickly provided. Call handling times are reduced.

Complex Information Sharing.

Intricate and urgent information can be shared more accurately, directly, and quickly with and between end-user. Financial, medical, pharmaceutical, technical, educational, gaming, operational, and other kinds of information in various visual and audio formats can be transferred directly between parties.

Entertainment.

Reserve your tickets more efficiently and view the open seats. In one scenario, a caller may be discussing seating options with an agent. In order to allow the caller to better view the venue layout, a data session may be used to quickly and effectively provide this information to the caller.

Hospitality.

Book a room, cruise, flight, or vehicle and receive visual confirmation along with other helpful information. Resort guests can receive an automated call along with the visuals and coupons for the specials at the prime dining facilities. Moreover, electronic boarding passes, confirmation numbers, itineraries, calendar items and other files can be transferred to, and saved by, the end-user for later use and reference.

Insurance.

Claims can be processed more effectively with the present invention. The insured calls the insurer when there is an accident. The insurer sends instructions of what to and what not to do along with an voice explanation. Other applications on the end-user device 1000, such as a camera application, may allow the end-user to quickly and effectively provide additional information to an insurance carrier.

Financial Services.

A broker can transfer in real time detailed visual information of various investment options for consideration while explaining the advantages.

Medical and Emergency Preparedness.

A physician or nurse can send urgent medical information to remote patients in the field and talk through it with them. These instructions can be saved to the mobile device for further review and future reference. The patient will more likely be able to handle the emergencies resulting in fewer medical complications and expenses.

These industry applications are exemplary only and should in no way be read to limit the present invention.

In conclusion, the present invention provides, among other things, a system and method for linking voice and data communications. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for voice and data communication, the method comprising:
   connecting an agent to a session server;
   receiving a voice call from an end-user;
   receiving an end-user phone number for the end-user;
   transmitting a data session request for the agent to the session server, wherein the data session request is based on the end-user phone number;
   establishing a data session through the session server, wherein establishing the data session comprises:
      receiving, at the session server, a notification for the end-user wherein the notification includes the end-user phone number, and wherein the notification indicates the end-user is available for the data session;
      receiving, at the session server, the data session request for the agent; and
      matching the end-user phone number from the notification for the end-user with the end-user phone number from the data session request for the agent, and
      connecting the agent and the end-user over the data session, wherein the data session and voice call are distinct and separate connections with the end-user.

2. The method of claim 1, wherein receiving the end-user phone number comprises:
   automatically receiving the end-user phone number.

3. The method of claim 2, wherein automatically receiving the end-user phone number comprises:
   automatically receiving ANI from a PSTN or other voice network.

4. The method of claim 1, wherein receiving the end-user phone number comprises:
   requesting the phone number from the end-user over the voice call; and
   receiving the phone number from the end-user over the voice call.

5. The method of claim 1, further comprising:
   receiving a payload from the session server, wherein the payload includes information related to the end-user.

6. The method of claim 5, wherein the payload comprises end-user context information.

7. The method of claim 5, wherein receiving the payload from the session server occurs before receiving the voice call from the end-user.

8. The method of claim 5, further comprising:
   controlling processing of the voice call based on the payload.

9. The method of claim 8, wherein controlling processing of the voice call based on the payload comprises:
   routing the voice call based on the payload.

10. The method of claim 8, wherein controlling processing of the voice call based on the payload comprises:
    selecting a call flow based on the payload.

11. The method of claim 8, wherein controlling processing of the voice call based on the payload comprises:
    selecting a call script for a live agent based on the payload.

12. The method of claim 1, wherein communicating with the end-user over the data session comprises:
    transmitting visual menus to the end-user; and
    receiving menu selections from the end-user.

13. The method of claim 1, wherein communicating with the end-user over the data session comprises:
    transmitting pages with data entry fields to the end-user, and
    receiving the data items provided by the end-user.

14. The method of claim 1, wherein communicating with the end-user over the data session comprises:
    transmitting data files to the end-user.

15. The method of claim 1, wherein communicating with the end-user over the data session comprises communicating with the end-user using an IVR, the method further comprising:
 transmitting a transfer request from the IVR to the session server, wherein the transfer request identifies an agent workstation; and
 connecting the agent workstation to the data session.

16. The method of claim 1, further comprising:
 assessing performance of the data session; and
 adjusting communications with the end-user based on the performance of the session.

17. The method of claim 16:
 wherein assessing performance of the data session comprises determining a delivery time for data messages to the end-user; and
 wherein adjusting communications with the end-user comprises adjusting a relative timing of voice messages and data messages to the end-user.

18. The method of claim 16:
 wherein assessing performance of the data session comprises obtaining a connection type for the end-user device and determining turnaround time for data messages to the end-user; and
 wherein adjusting communications with the end-user comprises adjusting communication capabilities.

19. A system for voice and data communication, the system comprising:
 an agent device and a session server;
 wherein the agent device is configured for:
  receiving a voice call from an end-user;
  transmitting a data session request to a session server, wherein the data session request comprises an end-user phone number; and
  communicating with the end-user over a data session established through the session server, wherein the data session and voice call are distinct and separate connections with the end-user; and
 wherein the session server is configured for establishing a data session between the agent device and end-user, wherein establishing the data session comprises:
  receiving, at the session server, a notification for the end-user wherein the notification includes the end-user phone number, and wherein the notification indicates the end-user is available for the data session;
  receiving, at the session server, the data session request for the agent; and
  matching the end-user phone number from the notification for the end-user with the end-user phone number from the data session request for the agent.

20. The system of claim 19, further comprising:
 means for automatically receiving the end-user phone number from the PSTN or other voice network.

21. The system of claim 20, wherein the means for automatically receiving the end-user phone number is a PBX.

22. The system of claim 20, wherein the agent device is the means for automatically receiving the end-user phone number.

23. The system of claim 19, wherein the agent device is an IVR.

24. The system of claim 19, further comprising:
 a session gateway connected to the IVR, wherein the session gateway provides an interface between the IVR and the session server.

25. The system of claim 19, wherein the agent device is an agent workstation.

* * * * *